(12) United States Patent
Kataoka et al.

(10) Patent No.: US 10,145,274 B2
(45) Date of Patent: Dec. 4, 2018

(54) INTERNAL COMBUSTION ENGINE

(71) Applicant: HONDA MOTOR CO., LTD., Minato-ku, Tokyo (JP)

(72) Inventors: Dai Kataoka, Wako (JP); Yoshihiro Takada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 138 days.

(21) Appl. No.: 15/474,303

(22) Filed: Mar. 30, 2017

(65) Prior Publication Data

US 2017/0284241 A1 Oct. 5, 2017

(30) Foreign Application Priority Data

Mar. 31, 2016 (JP) .................. 2006-071902

(51) Int. Cl.
| | |
|---|---|
| *F01L 1/34* | (2006.01) |
| *F01L 13/00* | (2006.01) |
| *F01L 1/02* | (2006.01) |
| *F01L 1/053* | (2006.01) |
| *F02D 13/08* | (2006.01) |
| *F01L 1/18* | (2006.01) |
| *F01L 1/047* | (2006.01) |

(52) U.S. Cl.
CPC .......... *F01L 13/0063* (2013.01); *F01L 1/022* (2013.01); *F01L 1/026* (2013.01); *F01L 1/053* (2013.01); *F01L 1/185* (2013.01); *F01L 13/0036* (2013.01); *F02D 13/08* (2013.01); *F01L 2001/0475* (2013.01); *F01L 2001/0476* (2013.01); *F01L 2001/0537* (2013.01); *F01L 2013/0052* (2013.01); *Y02T 10/18* (2013.01)

(58) Field of Classification Search
CPC . F01L 1/022; F01L 1/053; F01L 1/026; F01L 1/185; F01L 13/0063; F01L 13/0036; F01L 2001/0476; F01L 2001/0537; F01L 2001/0475; F01L 2013/0052; F02D 13/08; Y02T 10/18
See application file for complete search history.

(56) References Cited

U.S. PATENT DOCUMENTS 6,332,441 B1 * 12/2001 Sugiyama ................ F01L 1/02
                                                              123/195 C

FOREIGN PATENT DOCUMENTS

JP         2015-178817 A       10/2015

* cited by examiner

*Primary Examiner* — Zelalem Eshete
(74) *Attorney, Agent, or Firm* — Carrier Blackman & Associates, P.C.; Joseph P. Carrier; William D. Blackman

(57) ABSTRACT

An internal combustion engine is provided with a DOHC-type valve train in a cylinder head. The valve train includes an intake side camshaft with an intake side driven gear, and an exhaust side camshaft with an exhaust side driven gear. The cylinder head supports therein a spindle with an idle gear with an idle chain sprocket fixed thereto. The idle gear is in meshing engagement with both the intake and exhaust side driven gears. Rotary power of a crankshaft is transmitted via a cam chain to the idle gear to rotate both the intake and exhaust side camshafts. These camshafts are supported by bearings of a bearing wall and a camshaft holder. These bearings and camshaft holder are located, for compact arrangement, at a position axially coinciding or overlapping with the idle chain sprocket.

4 Claims, 15 Drawing Sheets

INTERNAL COMBUSTION ENGINE

TECHNICAL FIELD

The present invention relates to an internal combustion engine provided with a DOHC-type valve train or valve operating mechanism.

BACKGROUND ART

An internal combustion engine is known in which a DOHC-type valve train includes an intake side camshaft and an exhaust side camshaft in a cylinder head, an idle chain sprocket and an idle gear are interposed between the intake and exhaust side camshafts so as to transmit rotary power of the crankshaft to the intake and exhaust side camshafts (for example, refer to Patent Document 1).

PRIOR ART DOCUMENT

Patent Document

[Patent Document 1] JP 2015-178817 A

In the internal combustion engine disclosed in Patent Document 1, an intake side camshaft and an exhaust side camshaft are rotatably supported between a bearing wall of the cylinder head and a camshaft holder at two locations, and an end of the intake side camshaft and an end of the exhaust side camshaft protrude from the bearing wall. The protruding ends of both the intake and exhaust side camshafts have fixedly mounted thereto an intake side driven gear and an exhaust side driven gear, respectively. An idle gear is in meshing engagement with both the intake side driven gear and the exhaust side driven gear and has thereon an idle chain sprocket coaxially integrated therewith. A a cam chain is passed around the idle chain sprocket and a driving chain sprocket on the crankshaft, so that rotary power of the crankshaft is transmitted via the cam chain to the idle chain sprocket and the idle gear. Thus, rotation of the idle gear is transmitted to the intake and exhaust side camshafts via the meshing engagement of the idle gear with the intake and exhaust side driven gears, so that the intake and exhaust side camshafts are rotated in synchronization with the rotation of the crankshaft.

The coaxially integrated idle gear and idle chain sprocket are rotatably supported on the spindle supported between an outside wall of the cylinder head and the bearing wall. Further, the idle chain sprocket is arranged adjacent the bearing wall, and the idle gear is arranged adjacent to the cylinder head outside wall axially apart from the bearing wall (see FIG. 8 of Patent Document 1).

SUMMARY OF INVENTION

Technical Problem

As the camshafts (the intake and exhaust camshafts) is supported by bearings at directly upper portions of the bearing wall without being axially displaced, the driven gears (the intake and exhaust side driven gears) have to be positioned at axial positions apart from the bearing wall to enable meshing engagement with the idle gear which is adjacent to the cylinder head outside wall. This means that the driven gears have to be positioned axially apart from the bearing wall and beyond the idle chain sprocket.

For this reason, the axial length of the intake and exhaust side camshafts are increased. Furthermore, the intake and exhaust side driven gears are of a large diameter and are fixedly supported on the ends of the intake and exhaust side camshafts, protruding apart from the bearing wall, axial size of the internal combustion engine is enlarged so that entire engine size increases.

The present invention is made in view of the above problem and an object of the invention is to provide an internal combustion engine in which the protruding length of the camshafts from the bearing wall is reduced and in which the driven gears on the protruding ends are positioned close to the bearing wall, so that the engine size is reduced.

Solution to Problem

To achieve the above object, the present invention provides an internal combustion engine, comprising: a cylinder head fixedly fastened on a cylinder block; a crankshaft rotatable by a piston in the cylinder block; a DOHC-type valve train provided in the cylinder head and including a rotatable intake side camshaft and a rotatable exhaust side camshaft in parallel arrangement; a bearing wall with bearings for rotatably supporting the intake side camshaft and the exhaust side camshaft, respectively; a camshaft holder for holding the intake side camshaft and the exhaust side camshaft supported by the bearings; an intake side driven gear and an exhaust side driven gear fixedly fitted on ends of the intake side camshaft and the exhaust side camshaft, respectively, the ends of the intake and exhaust side camshafts extending beyond the bearing wall and the camshaft holder; an idle gear fixedly supported on a spindle supported in the cylinder head to mesh with both the intake and exhaust side driven gears; an idle chain sprocket coaxially fixed to the idle gear at an axial position adjacent to the bearing wall; and a cam chain passed around a driving chain sprocket on the crankshaft and the idle chain sprocket in such a manner that rotational power of the crankshaft is transmitted to the intake and exhaust side camshafts; characterized in that:

the idle chain sprocket is positioned at an axial position coinciding or overlapping with axial positions of the bearings of the bearing wall and the camshaft holder, with respect to an axial direction parallel to the intake and exhaust side camshaft.

According to this configuration, as the idle chain sprocket is provided at the position axially overlapped with the bearing of the bearing wall and the camshaft holder, the idle gear can be brought close to the bearing wall in the axial direction, and the intake and exhaust side driven gears in meshing engagement with the idle gear are also brought close to the bearing wall. Further, as the idle gear can be positioned to mesh with both the intake and exhaust side camshafts having a reduced protruding length from the bearing wall, axial size of the internal combustion engine is suppressed to be small, and the engine can be made compact.

In a preferred embodiment of the invention, the camshaft holder is fastened to the bearing wall to cover the bearings by fastening bolts, at the same axial position as the idle chain sprocket, to rotatably support the intake and exhaust side camshafts; and out of the fastening bolts, some fastening bolts arranged at ends of the camshaft holder, with respect to a direction transverse to the axial direction, fasten portions of the camshaft holder on both sides of the idle chain sprocket.

According to this configuration, as the fastening bolts arranged at the ends of the camshaft holder out of the fastening bolts fasten the portions on both sides with the idle chain sprocket positioned between the fastened portions, the outside fastening bolts located at the same axial positions as the idle chain sprocket need not avoid interference with the idle chain sprocket, so that the outside fastening bolts are not caused to project upward for the purpose of avoiding interference with the idle chain sprocket below. Therefore, the upper part of the engine does not protrude upward, and size of the engine can be suppressed.

According to a preferred embodiment of the invention, the bearing wall and the camshaft holder have protruding portions extending axially inward of the bearing wall and the camshaft holder and located between the intake side camshaft and the exhaust side camshaft; and out of the fastening bolts, at least one fastening bolt fastens a part of the camshaft holder, in the protruding portions.

According to this configuration, the bearing wall and the camshaft holder are provided with the protruding portions extending to the inside in the axial direction between the intake side camshaft and the exhaust side camshaft, and at least one inside fastening bolt out of the fastening bolts fastens a part of the protruding portions. Thus, the inside fastening bolt can fasten the protruding portions together, axially avoiding the idle chain sprocket and utilizing the space between the intake side camshaft and the exhaust side camshaft, so that the camshaft holder can be compactly attached without increasing the size of the engine.

According to a further preferred embodiment of the invention, the internal combustion engine comprises: a cylindrical intake side cam carrier fitted on and around the intake side camshaft in a manner co-rotatable with, and axially slidable relative to the intake side camshaft, and having a plurality of cam lobes different in cam profile and axially adjacent to each other, the intake side cam carrier having a lead groove cylindrical portion including a lead groove for fitting engagement with a changeover pin; a cylindrical exhaust side cam carrier fitted on and around the exhaust side camshaft in a manner co-rotatable with, and axially slidable relative to the exhaust side camshaft, and having a plurality of cam lobes different in cam profile and axially adjacent to each other, the exhaust side cam carrier having a lead groove cylindrical portion including a lead groove for fitting engagement with a changeover pin; and cam changeover mechanisms for advancing and retracting the changeover pin into engagement with and disengagement from the lead groove to axially shift the intake side cam carrier and the exhaust side cam carrier so as to change over the cams lobes; wherein the lead groove cylindrical portions including the lead grooves have an outer diameter smaller than an outer diameter of base circle of the cam lobes; and the protruding portions are located in the same axial area as one lead groove cylindrical portion of at least one of the intake side cam carrier and the exhaust side cam carrier.

According to this configuration, the outer diameter of the lead groove cylindrical portion including the lead groove is smaller than the outer diameters of the base circles of the plural cam lobes, and the protruding portions are located in the same axial area as the at least one lead groove cylindrical portion of the intake and exhaust side cam carriers. The intake and exhaust side cam carriers and the protruded portions can be mutually positioned close to each other without interference with the cam lobes, because the protruding portions protruding in the axial space between the intake and exhaust side camshafts are located in the same axial area as the lead groove cylindrical portion having a reduced smaller outer diameter than the outer diameters of the base circles of the cam lobes. Consequently, engine can be reduced in size.

Advantageous Effects of Invention

In the present invention, as the bearing wall and the camshaft holder are positioned at the same axial position as the idle chain sprocket which is disposed adjacent to the bearing wall and at axially inner side of the idle gear, the idle gear can be brought axially close to the bearing wall, the intake and exhaust side driven gears in meshing engagement with the idle gear can be positioned axially close to the bearing wall. Furthermore, the intake and exhaust side driven gears are fitted on the end portions, with a reduced protruding length, of the intake and exhaust side camshafts, whereby axial size of the engine is reduced and the entire engine is made compact.

DESCRIPTION OF EMBODIMENT

Referring to FIGS. 1 to 17, an embodiment according to the present invention will be described below.

Figure 3:
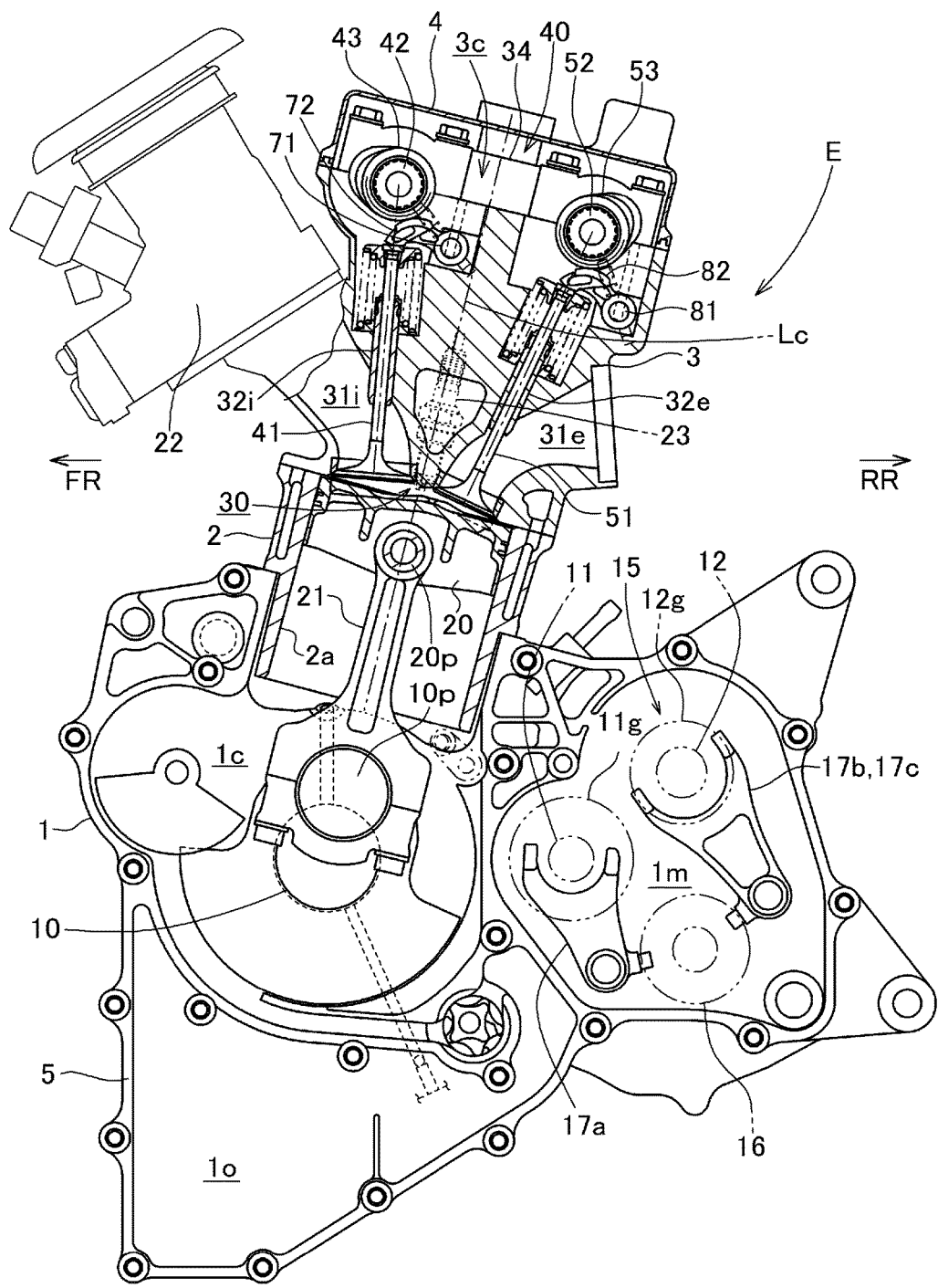
FIG. 3 is a left side view showing the internal combustion engine with a part omitted, the left side view being partially a sectional view showing a part including valves.

An internal combustion engine E is an air-cooled single-cylinder 4-stroke internal combustion engine and is provided with a variable valve operating mechanism or valve train 40, shown in FIG. 3, according to this embodiment. The engine E is mounted on a motorcycle (not shown) provided with a four-valve type valve operating mechanism of DOHC structure.

In the description, a longitudinal direction is in accordance with the normal standard of a motorcycle advancing forward, and a transverse direction is a left-right or transverse direction of the motorcycle. In the drawings, FR denotes the front side of the motorcycle, RR denotes the rear side, LH denotes the left side, and RH denotes the right side.

The internal combustion engine E is mounted on the vehicle with a crankshaft 10 thereof oriented in the transverse (left-right) direction of the vehicle.

As shown in FIG. 3 a crankcase 1 journaling the crankshaft 10 directed in the transverse direction defines a crank chamber 1c housing the crankshaft 10, and a transmission chamber 1m housing a transmission M is formed at the back of the crank chamber 1c. An oil pan chamber 1o for storing lubricant oil is integrated with the bottom of the crank chamber 1c and partitioned by substantially horizontal partitions 1h.

Figure 1:
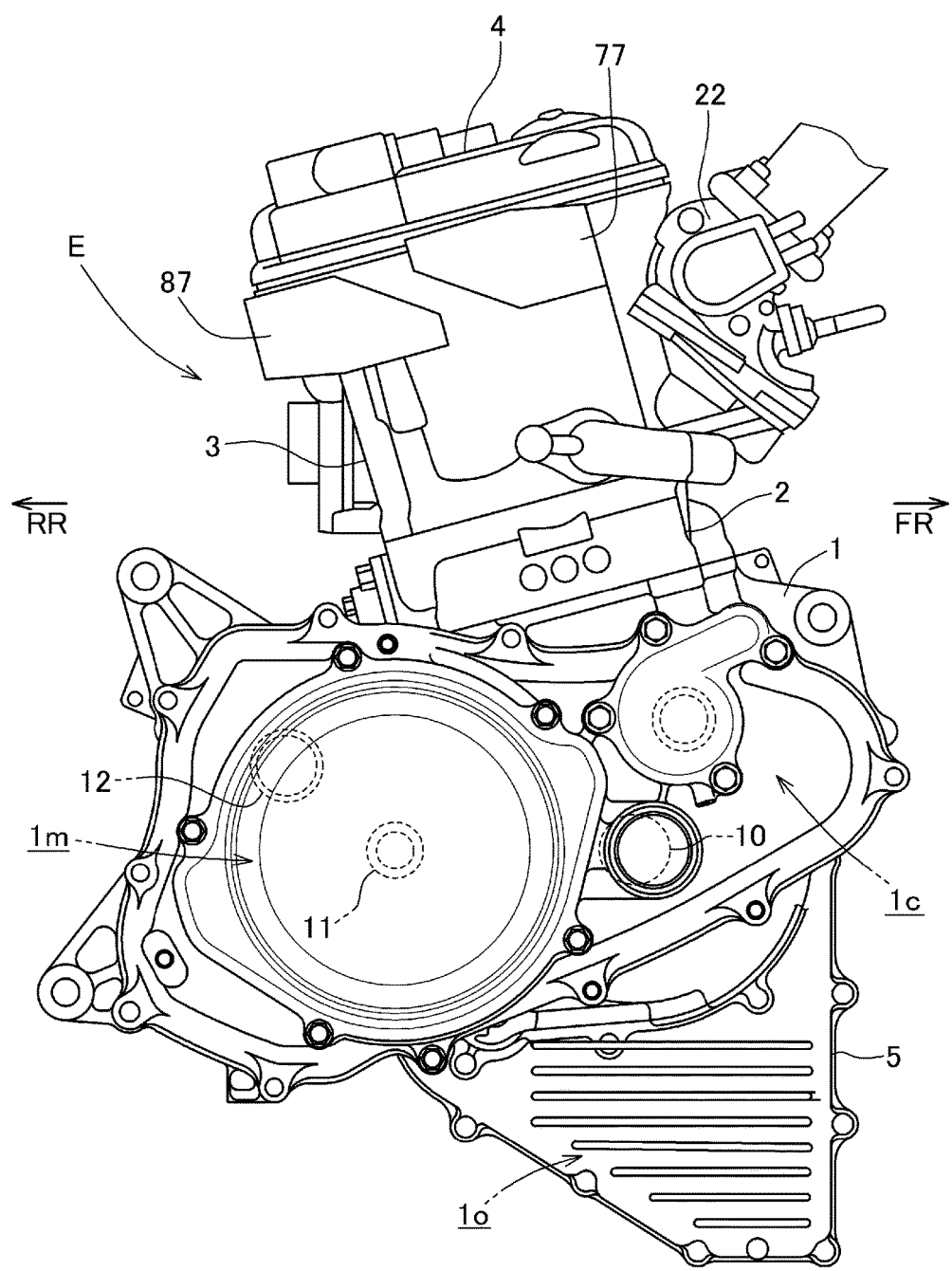
FIG. 1 is a right side view showing an internal combustion engine provided with a variable valve train according to an embodiment of the present invention.
Figure 2:
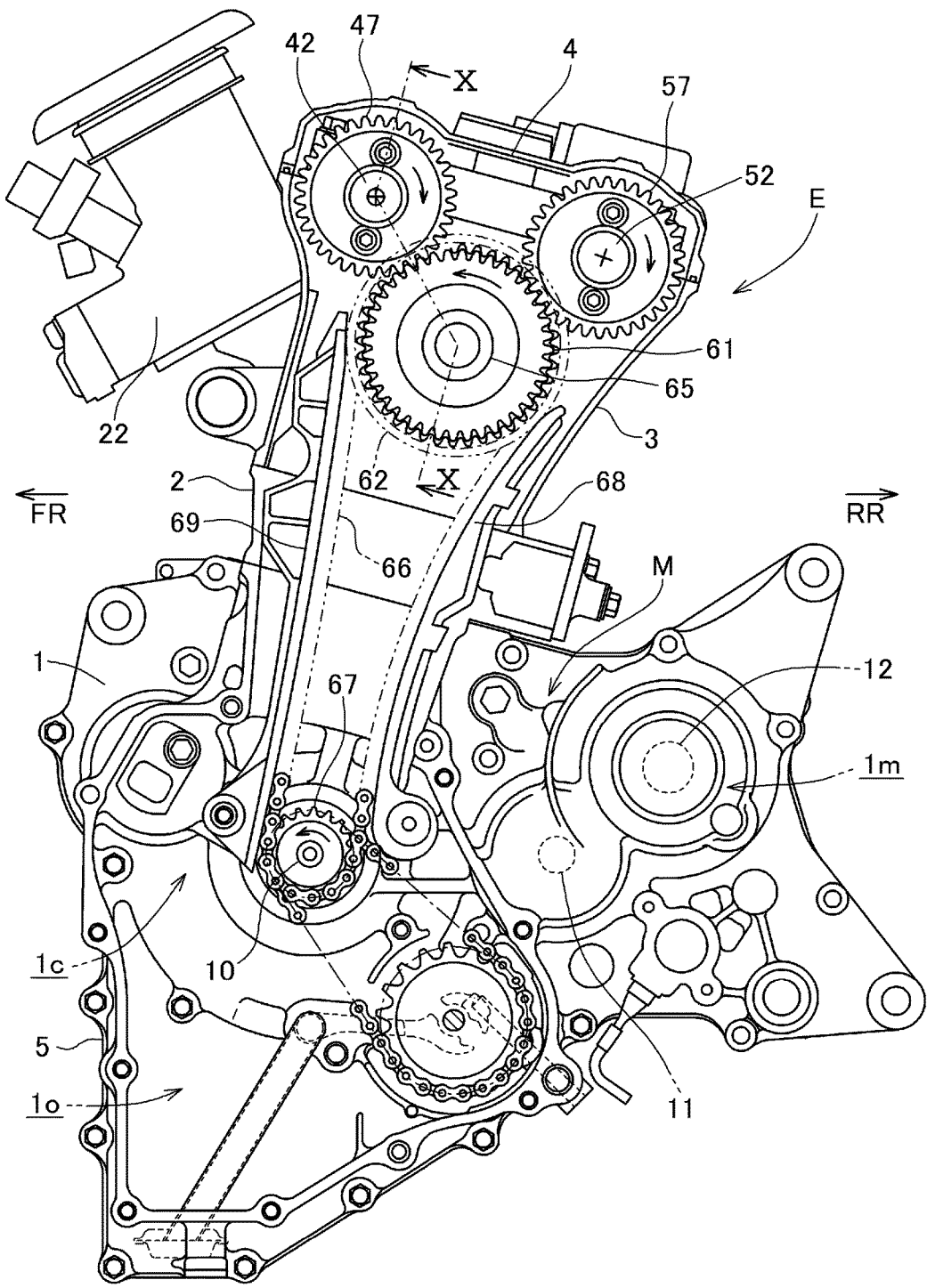
FIG. 2 is a left side view showing the internal combustion engine with some covering members are removed.

As shown in FIGS. 1 to 3, the internal combustion engine E is provided with an engine body configured by a cylinder block 2 provided with one cylinder 2a on the crank chamber 1c of the crankcase 1, a cylinder head 3 connected to an upper part of the cylinder block 2 via a gasket and a cylinder head cover 4 covering an upper part of the cylinder head 3.

A cylinder axis Lc which is a central axis of the cylinder 2a of the cylinder block 2 is slightly inclined backward. The cylinder block 2, the cylinder head 3 and the cylinder head cover 4 respectively piled on/over the crankcase 1 are extended upward from the crankcase 1 in an attitude to slightly incline backward.

An oil pan 5 forming the oil pan chamber 1o extends from the bottom of the crankcase 1.

A main shaft 11 and a counter shaft 12 of the transmission M are horizontally arranged in the transmission chamber 1m of the crankcase 1 to extend transversely in parallel with the crankshaft 10 (see FIG. 3), and the counter shaft 12 passes through the crankcase 1 leftward to protrude outside. The counter shaft 12 functions as an output shaft.

As illustrated in FIG. 3, the transmission M arranged in the transmission chamber 1m at the back of the crank chamber 1c includes the main shaft 11 and the countershaft 12, which are equipped with a main gear group 11g associated with the main shaft 11 and a counter gear group 12g associated with the counter shaft 12. The transmission M further includes a gear shift mechanism 15 equipped with a shift drum 16 and shift forks 17a, 17b and 17c respectively operated by a shift operation mechanism.

Still referring to FIG. 3, a piston 20 reciprocating in the cylinder 2a of the cylinder block 2 and the crankshaft 10 are coupled via a connecting rod 21 both ends of which are supported by a piston pin 20p and a crankpin 10p to constitute a crank mechanism.

This internal combustion engine E is provided with the 4-valve type variable valve operating mechanism 40 having the DOHC structure.

As shown in FIG. 3, the cylinder head 3 has therein a combustion chamber 30 located opposite to the top of the piston 20. Two intake ports 31i extend upward so as to curve forward from the combustion chamber 30, and two exhaust ports 31e extend so as to curve backward from the combustion chamber 30.

The two intake ports 31i are joined on the upstream side, and a throttle body 22 is provided in an intake passage extending from the joined portion. The upstream side of the intake passage of the throttle body 22 is open.

An ignition plug 23 is attached to the center of a ceiling wall of the combustion chamber 30 with one end of the ignition plug 23 directed into the combustion chamber 30.

Intake valves 41 and exhaust valves 51 slidably supported by valve guides 32i and 32e, respectively, are integrally fitted in the cylinder head 3. The intake valves 41 and the exhaust valves 51 are driven by the variable valve operating mechanism or valve train 40 provided in engine E. The variable valve train 40 opens and closes intake openings of the intake ports 31i and exhaust openings of the exhaust ports 31e in synchronization with the rotation of the crankshaft 10.

The variable valve train 40 is provided in a valve chamber 3c formed by the cylinder head 3 and the cylinder head cover 4.

Figure 6:
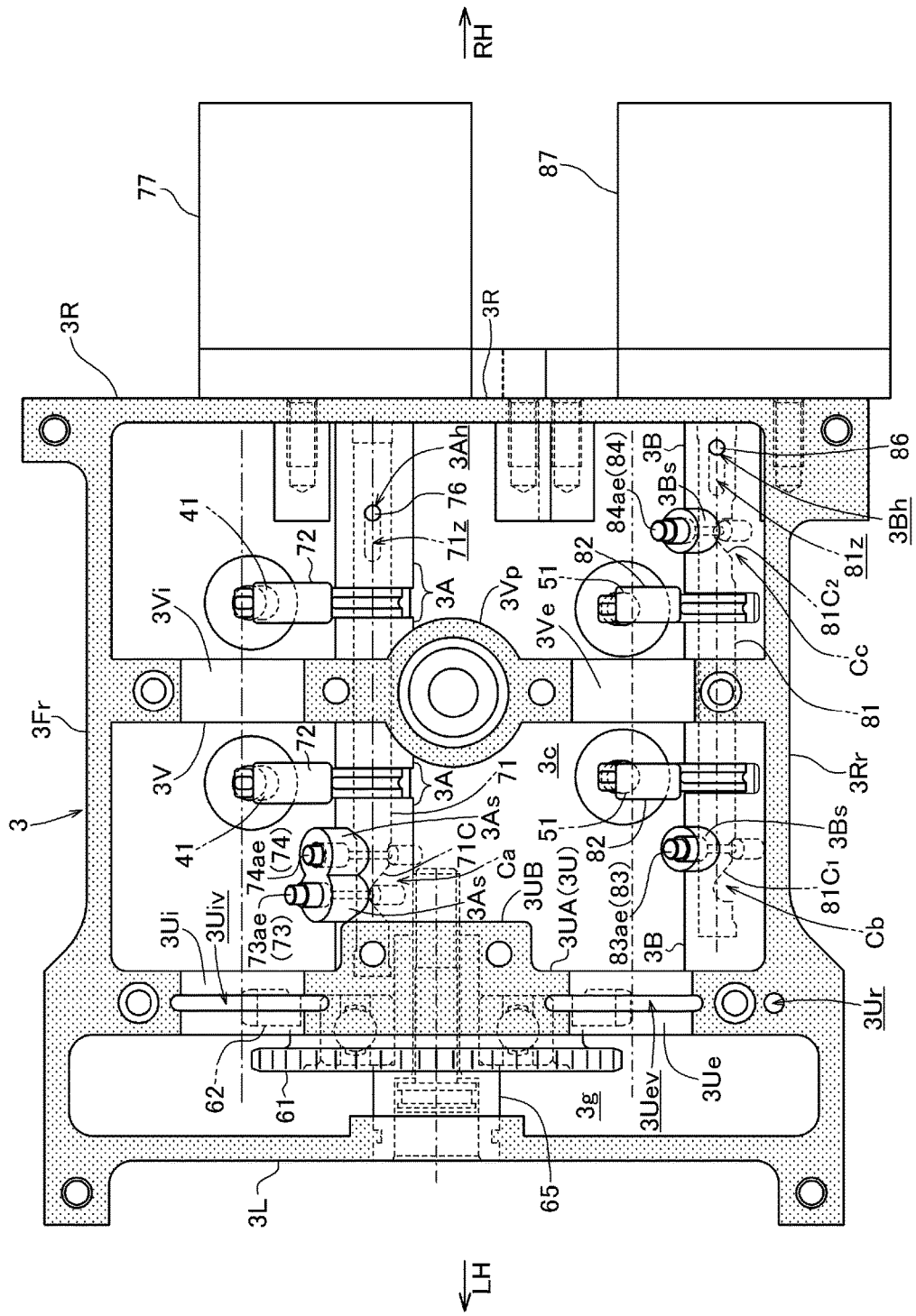
FIG. 6 is a top view showing the cylinder head viewed from above in such a state that camshafts are further removed together with cam carriers.

As shown in FIG. 6, a top view showing the cylinder head 3 seen from above, in which a part of the variable valve train 40 is removed, the cylinder head 3 is formed in a rectangular shape by a front wall 3Fr and a rear wall 3Rr on the front and rear sides in the longitudinal direction, and a left wall 3L and a right wall 3R on the left and right sides in the transverse direction. The valve chamber 3c is partitioned by a bearing wall 3U formed close to the left wall 3L in parallel with the left wall, and a gear chamber 3g is formed between the left wall 3L and the bearing wall 3U.

The valve chamber 3c is located on the upside of the combustion chamber 30 and partitioned into right and left chambers by a bearing wall 3V.

In an upper end surface of the bearing wall 3U partitioning the gear chamber 3g are formed front and rear bearing recesses 3Ui and 3Ue in the shape of a semi-circular cavity. Similarly, in an upper end surface of the bearing wall 3V partitioning the valve chamber 3c are formed front and rear bearing recesses 3Vi and 3Ve in the shape of a semi-circular cavity. A plug insertion cylinder 3Vp for inserting the ignition plug 23 is formed in the center of the bearing wall 3V.

Figure 4:
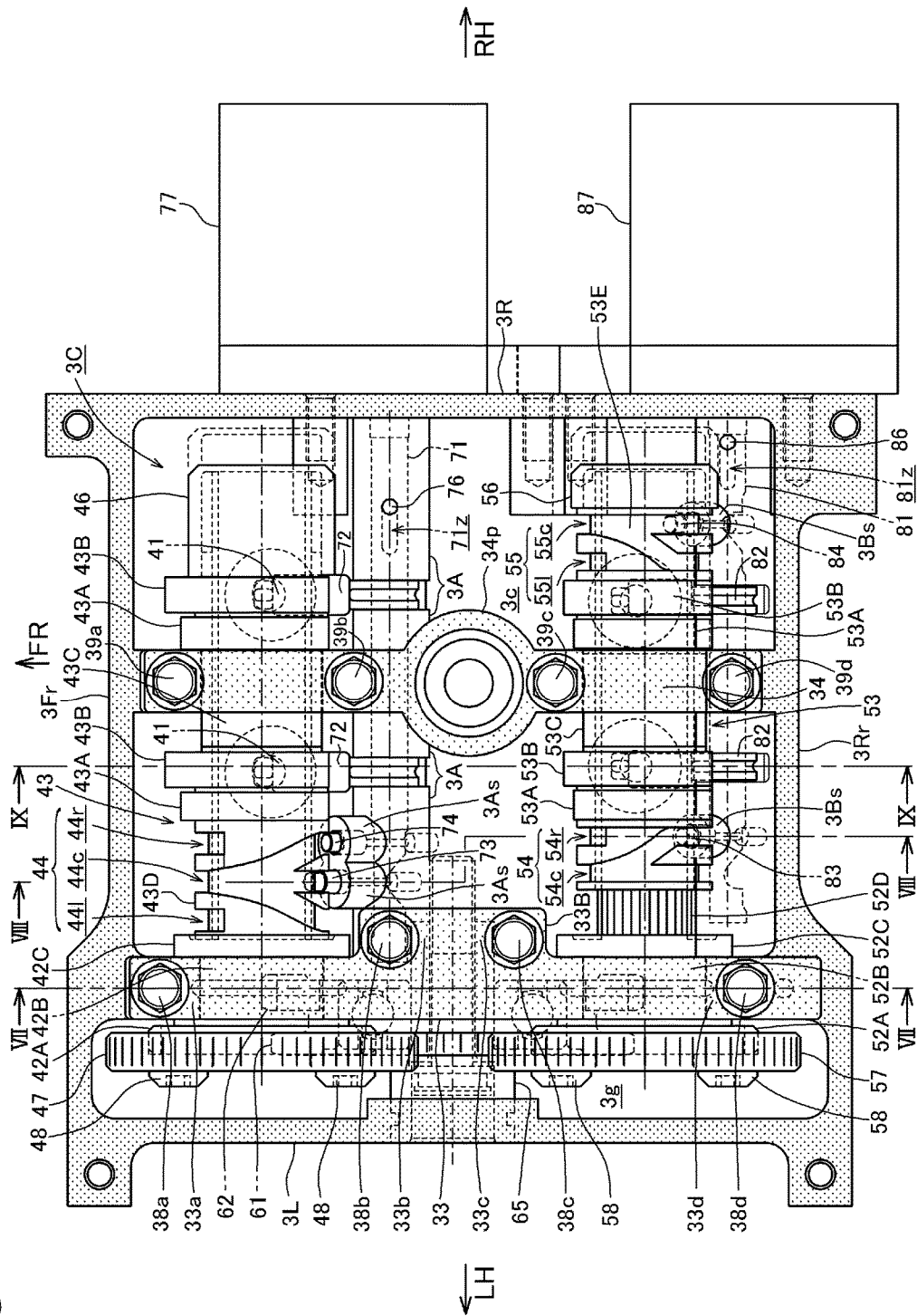
FIG. 4 is a top view showing a cylinder head viewed from above in such a state that a cylinder head cover is removed.

As shown in FIG. 3, an intake side camshaft 42 is arranged to extend in the transverse direction in a region above the pair of right and left intake valves 41, and an exhaust side camshaft 52 is arranged to extend in the transverse direction in a region above the pair of right and left exhaust valves 51. These intake side and exhaust side camshafts 42 and 52 are rotatably journaled in such a manner that these camshafts 42 and 52 are held between the bearing walls 3U and 3V. The intake side and exhaust side camshafts 42 and 52 are held on the bearing walls 3U and 3V and held from above by camshaft holders 33 and 34 put on the bearing walls 3U and 3V, respectively, as shown in FIGS. 4 and 10.

Figure 5:
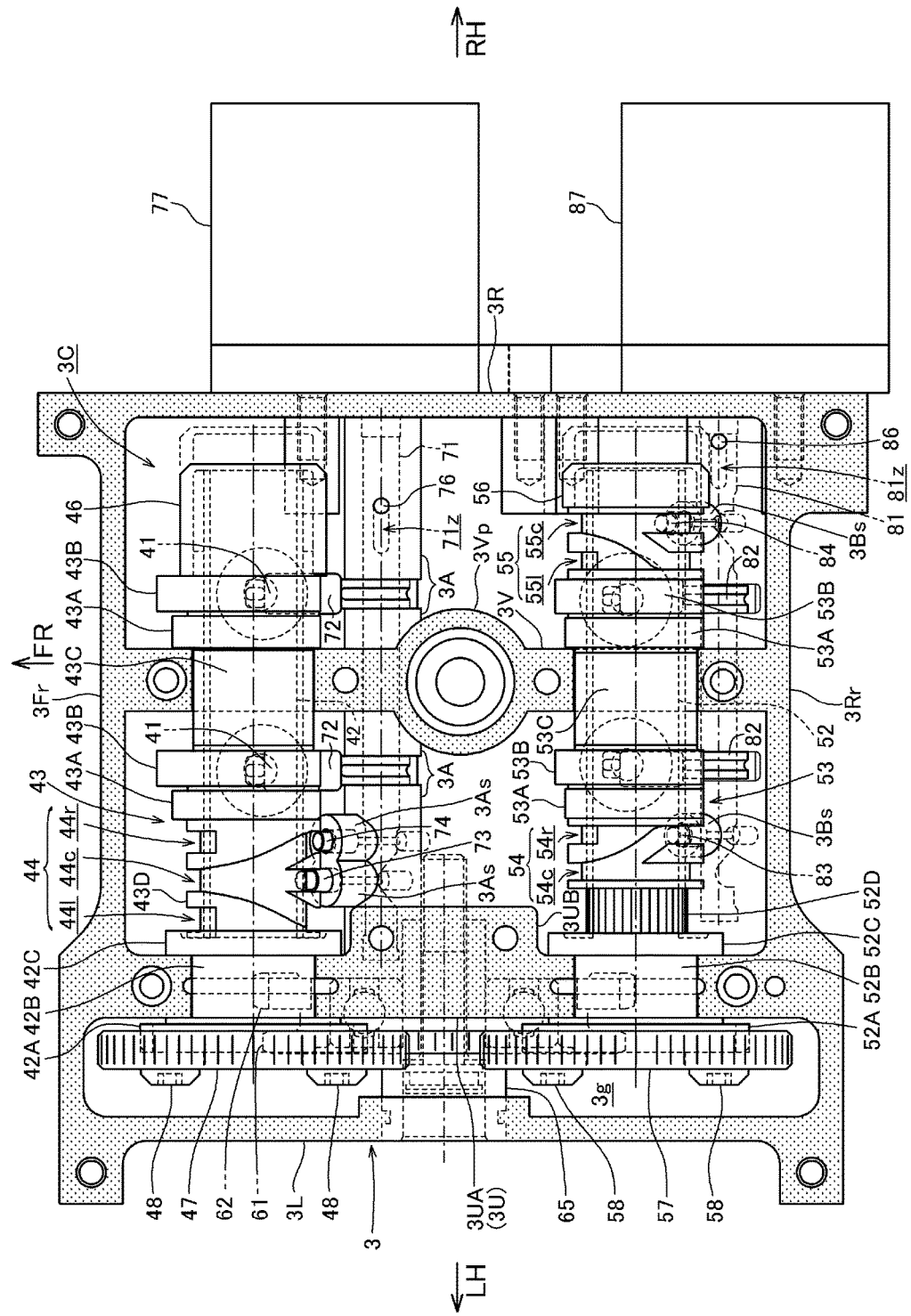
FIG. 5 is a top view showing the cylinder head viewed from above in such a state that a camshaft holder is further removed.
Figure 10:
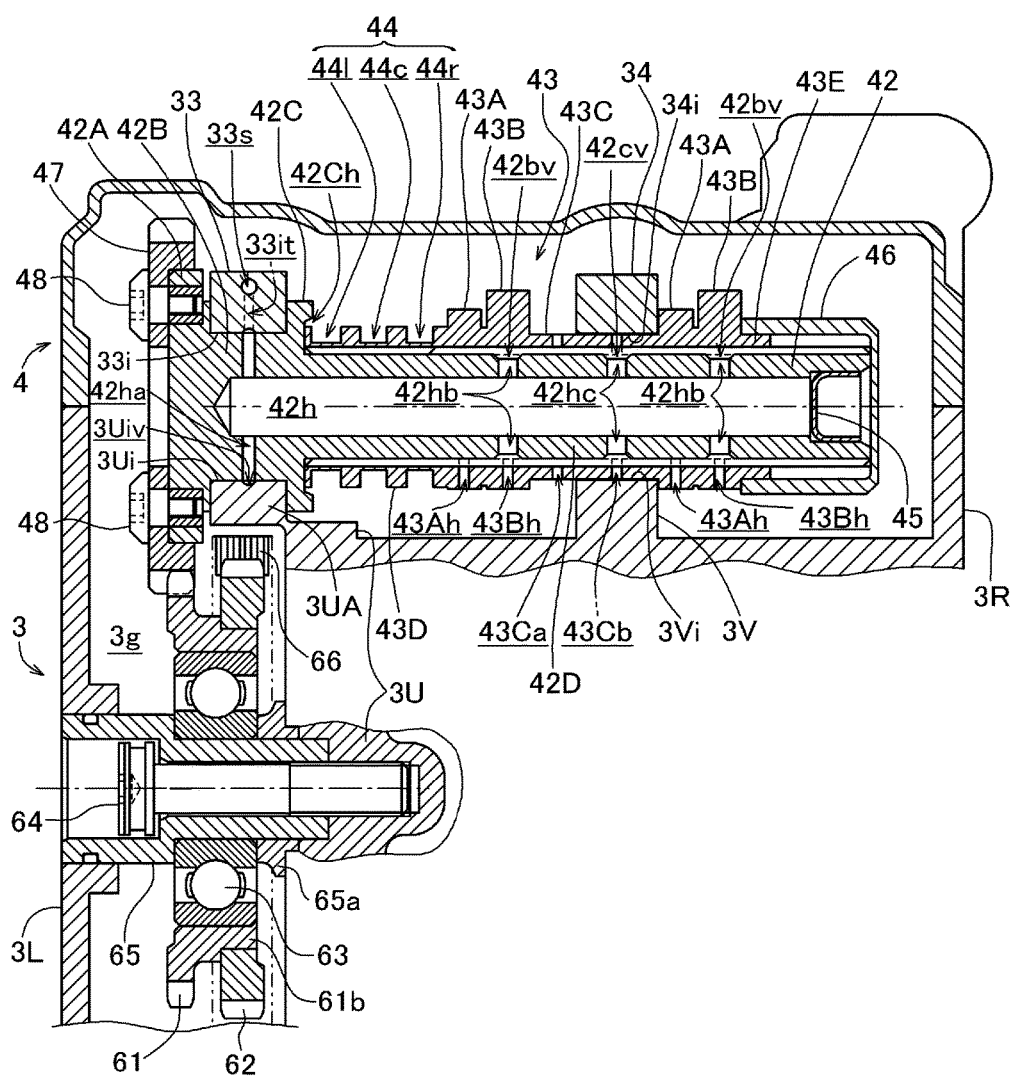
FIG. 10 is a sectional view taken along a line X-X in FIG. 2.

Referring to FIGS. 5 and 10, the intake side camshaft 42 is provided with a journal portion 42B of an enlarged diameter to be supported by the bearing wall 3U, and flanges 42A and 42C are formed on the left and right sides of the journal portion 42B.

A spline shaft 42D (FIG. 10) having splines on the outer peripheral surface extends on the right side of the right flange 42C.

A lubricant oil passage 42h is bored in the intake side camshaft 42 along the longitudinal axis thereof from the right end to the inside of the journal portion 42B through the inside of the spline shaft 42D. A lubricant oil communicating hole 42ha is formed radially from the left end of the lubricant oil passage 42h to the outer peripheral surface of the journal portion 42B. From within the lubricating oil passage 42h extend cam communicating oil hole 42hb, bearing communicating oil holes 42hc and cam communicating oil holes 42hb, which are bored radially in the spline shaft 42D at spaced-apart three locations in the axial direction.

As FIG. 10 shows, the left cam communicating oil holes 42hb, the central bearing communicating oil holes 42hc and the right cam communicating oil holes 42hb are open to an annular cam peripheral groove 42bv, an annular bearing peripheral groove 42cv and an annular cam peripheral groove 42bv, respectively formed in a state to surround the outer peripheral surface of the spline shaft 42D at totally three locations.

A plug 45 is press-fitted in the right end of the lubricant oil passage 42h and the lubricant oil passage 42h is closed thereby.

Figure 7:
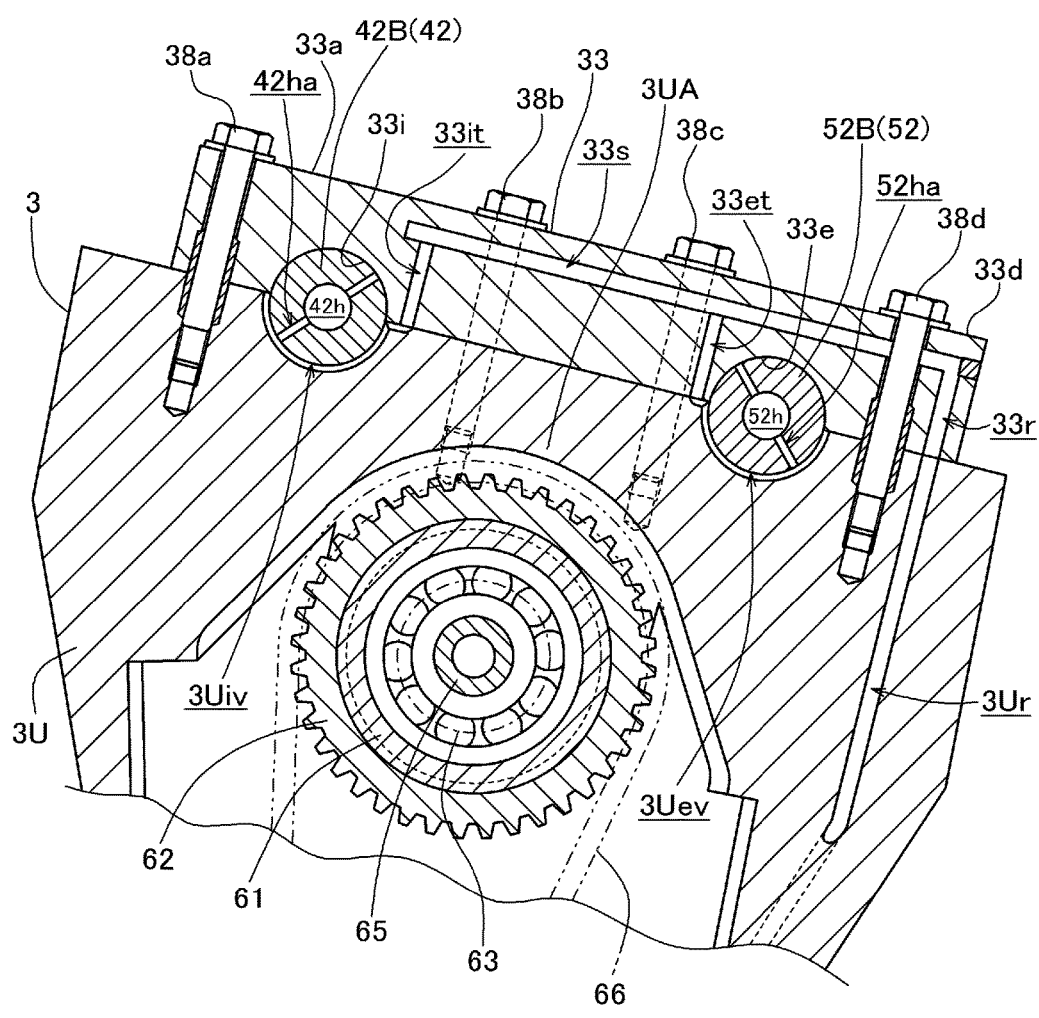
FIG. 7 is a sectional view taken along a line VII-VII in FIG. 4.

Referring to FIGS. 6 and 7, the bearing 3UA of the cylinder head 3 has inner circumferential oil grooves 3Uiv and 3Uev formed in the bearing recesses 3Ui and 3Ue for bearing the intake side camshaft 42 and the exhaust side camshaft 52, respectively.

In the meantime, as shown in FIG. 7, a common oil passage 33s is formed in the camshaft holder 33 in the longitudinal direction and along the top surface of the camshaft holder 33. The common oil passage 33s passes above bearing recess 33i and 33e of the camshaft holder 33, respectively, for bearing the intake side camshaft 42 and the exhaust side camshaft 52.

The common oil passage 33s passes at its halfway portion through a bolt hole for a fastening bolt 38d to be described later.

Branch oil passages 33it and 33et branching from the common oil passage 33s are formed to extend to a mating face of the camshaft holder 33 with the bearing 3UA of the cylinder head 3 (see FIG. 7).

Still referring to FIG. 7, the branch oil passage 33it communicates with the inner circumferential oil groove 3Uiv open to the rear side of the bearing recess 3Ui of the cylinder head 3, while the branch oil passage 33et communicates with the inner circumferential oil groove 3Uev open to the front side of the bearing recess 3Ue of the cylinder head 3.

The common oil passage 33s communicates with a vertical oil passage 33r at the rear end. The vertical oil passage 33r communicates with a vertical oil passage 3Ur in the bearing wall 3U of the cylinder head 3.

Accordingly, oil passing through the vertical oil passage 3Ur of the cylinder head 3 flows into the common oil passage 33s via the vertical oil passage 33r in the camshaft holder 33. Then, the oil is distributed into the branch oil passages 33it and 33et from the common oil passage 33s, and the distributed oil is supplied to the inner circumferential oil grooves 3Uiv and 3Uev. The supplied oil lubricates the bearings for the intake side camshaft 42 and the exhaust side camshaft 52.

Further, the lubricating oil communicating hole 42ha (FIG. 10) in the journal portion 42B of the intake side camshaft 42 is open to the inner circumferential oil groove 3Uiv (FIGS. 7 and 10), and oil is supplied from the inner circumferential oil groove 3Uiv to the lubricating oil passage 42h in the intake side camshaft 42 through the lubricating oil communicating hole 42ha.

Similarly, the lubricating oil communicating hole 52ha in the journal portion 52B of the exhaust side camshaft 52 is open to the inner circumferential oil groove 3Uev (FIG. 7), and oil is supplied from the inner circumferential oil groove 3Uev into the lubricating oil passage 52h in the exhaust side camshaft 52 through the lubricating oil communicating hole 52ha.

As shown in FIG. 10, the oil supplied from the lubricating oil communicating hole 42ha of the journal portion 42B of the intake side camshaft 42 into the lubricating oil passage 42h is discharged from the cam communicating oil holes 42hb, the bearing communicating oil holes 42hc and the cam communicating oil holes 42hb onto the peripheral surface of the spline shaft 42D.

The oil supplied from the lubricating oil communicating hole 52ha of the journal portion 52B of the exhaust side camshaft 52 into the lubricating oil passage 52h is discharged onto the outer peripheral surface of the spline shaft 52D from a similar communicating oil hole not shown.

A cylindrical intake side cam carrier 43 is fitted on the spline shaft 42D of the intake side camshaft 42 via splines.

Accordingly, the intake side cam carrier 43 is axially slidably fitted onto the intake side camshaft 42 in a state in which rotation of the cam carrier 43 relative to the intake side camshaft 42 is prevented.

The oil discharged from the cam communicating oil holes 42hb, the bearing communicating oil holes 42hc and the cam communicating oil holes 42hb is supplied into the spline-fitting portions between the spline shaft 42D and the intake side cam carrier 43 (see FIG. 10).

Still referring to FIG. 10, a recess 42Ch for accepting and abutting the left end of the intake side cam carrier 43 is formed in the right surface of the flange 42C on the right side of the enlarged-diameter journal portion 42B of the intake side camshaft 42.

The recess 42Ch enables the enlarged-diameter journal portion 42B of the intake side camshaft 42 to be located axially close to the intake side cam carrier 43, while securing an axial moving space required for the intake side cam carrier 43. Consequently, the intake side camshaft 42 can be set to be of axially reduced length.

On the intake side cam carrier 43 are formed two right and left pairs of a first cam lobe 43A and a second cam lobe 43B, which are different in cam profile. These cam lobes 43A and 43B of each pair are adjacent to each other in the axial direction, and the pairs are placed respectively on the two axial ends of the outer peripheral surface of a journal cylindrical portion 43C of the cam carrier 43. The journal cylindrical portion 43C has a predetermined axial length and extends between the two pairs of the first and second cam lobes 43A and 43B.

Figure 8:
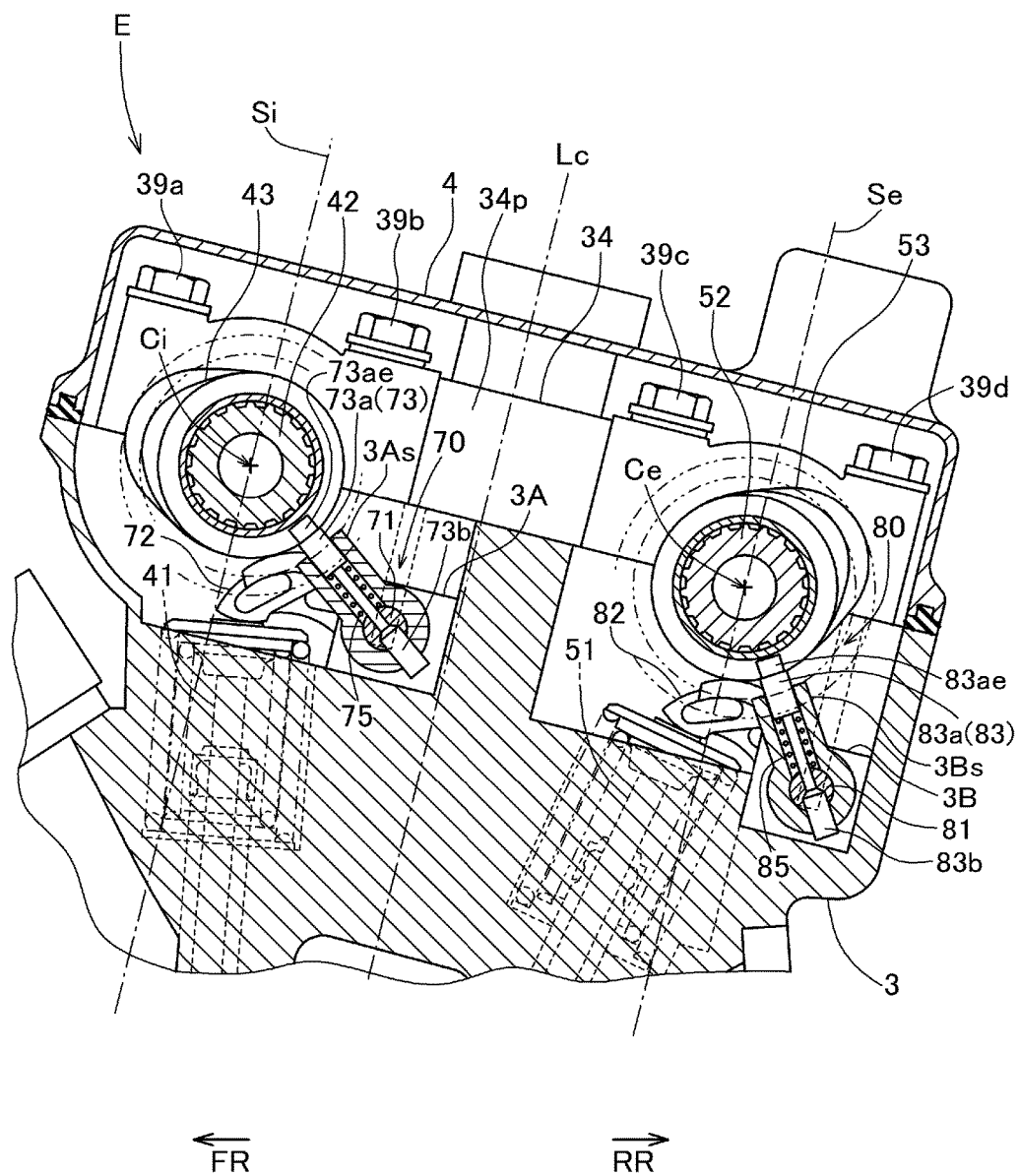
FIG. 8 is a sectional view taken along a line VIII-VIII in FIG. 4 and showing a state that the cylinder head cover is added.

The adjoining first and second cam lobes 43A and 43B have mutually equal outer diameters of their base circles of the cam profiles, and the adjoining first and second cam lobes 43A and 43B are located in the same circumferential or angular positions (see FIG. 8).

With reference to FIGS. 5 and 10, the intake side cam carrier 43 is formed with a lead groove cylindrical portion 43D including circumferential lead grooves 44 on the left side of the first cam lobe 43A in the left pair of the first cam lobe 43A and the second cam lobe 43B. The intake side cam carrier 43 is provided with a right-end cylindrical portion 43E on the right end of the right second cam lobe 43B in the right pair of the first cam lobe 43A and the second cam lobe 43B.

The lead groove cylindrical portion 43D has an outside diameter smaller than an outer diameter of a base circle of the same diameter as the first cam lobe 43A and the second cam lobe 43B (see FIG. 10).

The lead grooves 44 of the lead groove cylindrical portion 43D is made up of an annular lead groove 44c at an axial middle position, a left shift lead groove 44l and a right shift lead groove 44r. These shift lead grooves 44l and 44r are branched from the middle annular lead groove 44c and extend spirally and axially away from the middle annular lead groove 44c to axial positions at a predetermined axial distance from the middle annular lead groove 44c (see FIGS. 4 and 10).

The left shift lead groove 44l is formed close to the left end of the intake side cam carrier 43.

Accordingly, the axial end portion of the intake side cam carrier 43 can be made as short as possible and the axial length of the intake side cam carrier 43 itself can be reduced.

When the left end of the intake side cam carrier 43 is placed, as shown in FIG. 10, in the recess 42Ch formed in the right side of the journal portion 42B of the intake side camshaft 42, a part of the left shift lead groove 44l formed close to the left end of the intake side cam carrier 43 is also put in the recess 42Ch. However, as the remaining part of the left shift lead groove 44l is exposed without being put in the recess 42Ch, the left shift lead groove does not interfere with a first changeover pin 73 to be described later, and there is no problem in cam switching operation.

Still referring to FIG. 10, the journal cylindrical portion 43C of the intake side cam carrier 43 has bearing lubrication holes 43Ca and 43Cb connecting the inside and the outside of the cylindrical portion 43c. The bearing lubrication holes 43Ca and 43Cb are formed at two locations in the axial direction of the journal cylindrical portion 43C.

Figure 9:
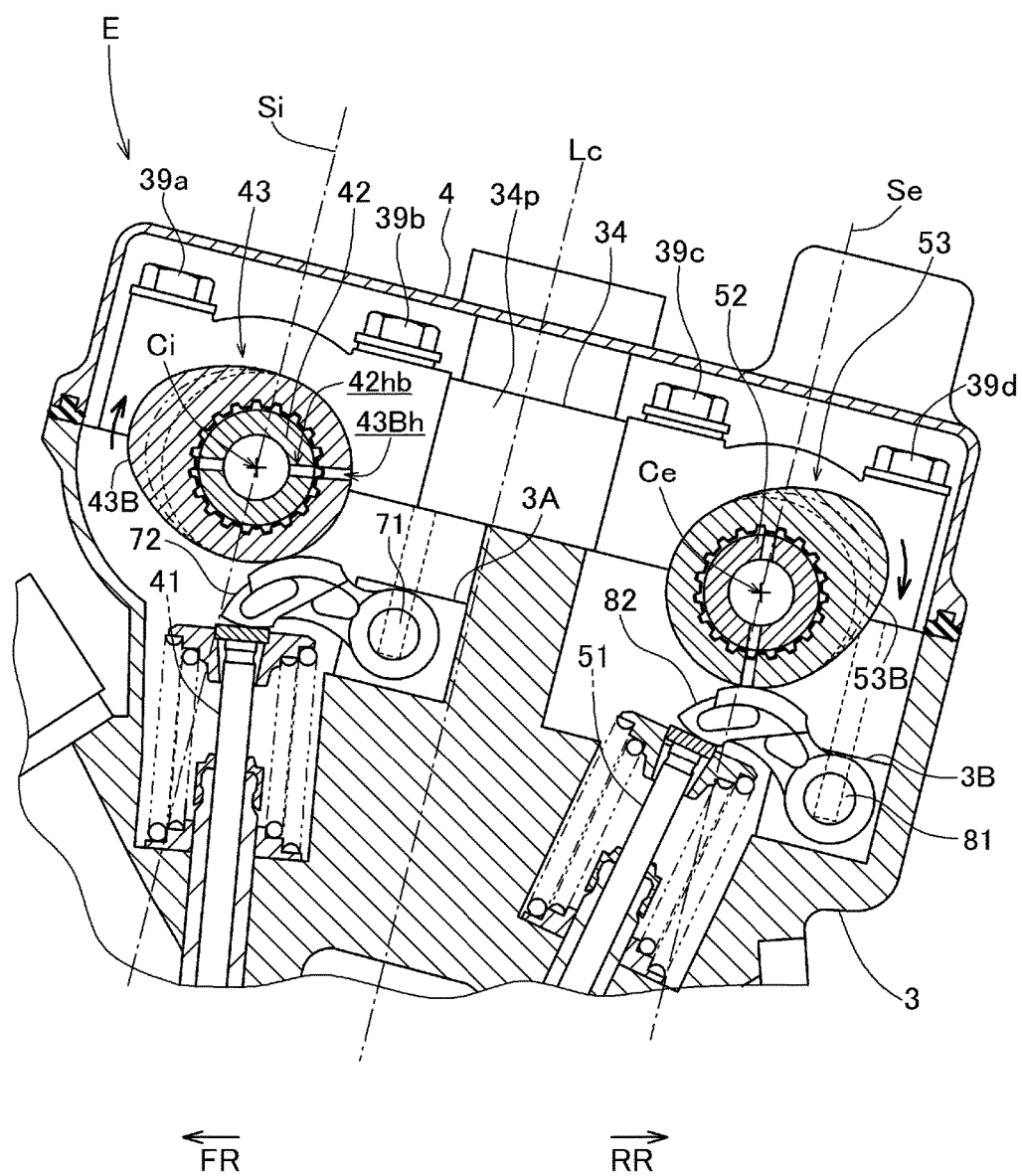
FIG. 9 is a sectional view taken along a line IX-IX in FIG. 4 and showing a state that the cylinder head cover is added.

Besides, cam lubrication holes 43Ah and 43Bh are also formed in each pair of the first cam lobe 43A and the second cam lobe 43B (FIGS. 9 and 10). The cam lubrication holes 43Ah and 43Bh communicate from inside with the outside of the associated surfaces of the cams forming the base circles.

The intake side cam carrier 43 and a similar exhaust side cam carrier 53 are turned clockwise in the side view of FIG. 9. The cam surface of the second cam lobe 43B shown in FIG. 9 of the intake side cam carrier 43 being turned slidingly contacts an intake rocker arm 72 to be described later, so that the intake rocker arm 72 is rocked and the intake valve 41 is moved.

The surface of a cam nose of the second cam lobe 43B has a side on which the cam nose first slidingly contacts the intake rocker arm 72 at a higher cam contact pressure, the other side on which the cam nose slidingly contacts the intake rocker arm 72 afterward at a smaller cam contact pressure. The cam lubrication hole 43Bh of the second cam lobe 43B is formed in the cam surface of the base circle of the second cam lobe 43B at a position closer to the higher cam contact pressure side.

The cam lubrication hole 43Ah of the first cam lobe 43A is similarly formed in such a manner that the cam lubrication hole 43Ah is open in the cam surface of the base circle of the first cam lobe 43A at a position close to the side with a higher cam contact pressure.

Cam lubrication holes in a first cam lobe 53A and a second cam lobe 53B of the exhaust side cam carrier 53 are also formed in a similar way.

A bottomed cylindrical cap 46 is fitted on a right-end cylindrical portion 43E of the intake side cam carrier 43.

An intake side driven gear 47 is coaxially fitted on the left flange 42A of the intake side camshaft 42 from the left side, and the intake side driven gear 47 is integrally fastened by two screws 48 (FIG. 10).

As illustrated in FIG. 10, the intake side cam carrier 43 is fitted on the spline shaft 42D of the intake side camshaft 42 via splines, in such a state that the cap 46 is fitted on the right-end cylindrical portion 43E of the intake side cam carrier 43, the journal portion 42B of the intake side camshaft 42 is rotatably supported between the bearing recess 3Ui formed in the bearing wall 3U of the cylinder head 3 and the semi-circular bearing recess 33i of the camshaft holder 33. The journal cylindrical portion 43C of the intake side cam carrier 43 is rotatably supported between the bearing recess 3Vi formed in the bearing wall 3V of the cylinder head 3 and a semi-circular bearing recess 34i of the camshaft holder 34.

The intake side camshaft 42 is axially positioned relative to the bearing wall 3U of the cylinder head 3 and the camshaft holder 33 with the left and right flanges 42A and 42C of the journal portion 42B fitting on the two sides of the cam shaft holder 33 and on the two sides of the bearing wall 3U of the cylinder head 3. Then, the intake side driven gear 47 mounted on the left flange 42A is located in the gear chamber 3g.

As described above, the intake side cam carrier 43 is spline-fitted on the spline shaft 42D of the intake side camshaft 42, so that the intake side cam carrier 43 can be axially shifted, while being rotated together with the intake side camshaft 42.

As the journal cylindrical portion 43C, with an axial predetermined length, of the intake side cam carrier 43 is supported by the bearing wall 3V of the cylinder head 3 and the camshaft holder 34, axial shift of the intake side cam carrier 43 is limited when the second cam lobe 43B opposite to the left sides of the bearing wall 3V and the camshaft holder 34 abuts on the bearing wall 3V and the camshaft holder 34, and when the first cam lobe 43A opposite to the right sides of the bearing wall 3V and the camshaft holder 34 abuts on the bearing wall 3V and the camshaft holder 34 (see FIG. 10).

Still referring to FIG. 10, lubricant oil in the lubricant oil passage 42h in the intake side camshaft 42 is discharged from the cam communicating oil holes 42hb, the bearing communicating oil holes 42hc and the cam communicating oil holes 42hb into the cam peripheral groove 42bv, the bearing peripheral groove 42cv and the cam peripheral groove 42bv, respectively. The oil lubricates the spline-fitted portions between the spline shaft 42D and the intake side cam carrier 43 around the spline shaft 42D. The bearing communicating oil holes 42hc of the journal portion 42B of the intake side camshaft 42 is located at the same axial position as the bearing wall 3V and the camshaft holder 34. Further, the journal cylindrical portion 43C of the intake side cam carrier 43 surrounding the bearing communicating oil holes 42hc has the two bearing lubrication holes 43Ca and 43Cb. Thus, in the case of leftward shift of the intake side cam carrier 43, the bearing lubrication holes 43Cb are made to confront the bearing communicating oil holes 42hc, while in the case of rightward shift, the other bearing lubrication holes 43Ca are made to confront the bearing communicating oil holes 42hc, respectively, as shown in FIG. 5. Therefore, oil can be supplied into the bearing recesses 3Vi and 34i via either of the bearing lubrication holes 43Ca or the bearing lubrication holes 43Cb in both the cases, and the bearing recesses 3Vi and 34i can be supplied with lubricant oil.

To limit the axial shift of the intake side cam carrier 43 and to position the intake side cam carrier 43, a spherical engaging recesses may be formed, respectively, at axial positions of the bearing lubrication holes 43Ca and 43Cb in the inner circumferential surface of the intake side cam carrier 43. An engaging ball may be provided to be pressed by a helical spring installed inside at the axial position of each of the bearing communicating oil holes 42*hc* of the intake side camshaft 42 and to retractably protrude from the outer peripheral surface of the intake side camshaft 42. The engaging ball is engaged with each of the two engaging recesses.

The two engaging recesses and the engaging balls may be provided at any position in the axial direction of the intake side cam carrier 43 and the intake side camshaft 42 when the above-mentioned positional relation is met.

The cam communicating oil holes 42*hb* and 42*hb* on both sides of the bearing communicating oil hole 42*hc* of the intake side camshaft 42 are located at the same axial positions as the intake valves 41 and 41 (and the intake rocker arms 72 and 72 described later). In the leftward shift position of the intake side cam carrier 43, the second cam lobes 43B and 43B are located at the same axial positions as the intake valves 41 and 41, respectively (see FIG. 5), and in the rightward shift position of the intake side cam carrier 43, the first cam lobes 43A and 43A are located at the same axial positions as the intake valves 41 and 41, respectively.

Therefore, when the intake side cam carrier 43 is shifted leftward, the cam lubrication holes 43Bh and 43Bh of the second cam lobes 43B are made to confront the cam communicating oil holes 42*hb* and 42*hb* of the intake side camshaft 42, oil is supplied to the cam surfaces of the second cam lobes 43B and 43B, and parts in sliding contact with the intake rocker arms 72 and 72 are lubricated as will be understood from FIG. 10.

When the intake side cam carrier 43 is shifted rightward, the cam lubrication holes 43Ah and 43Ah of the first cam lobes 43A and 43A are made to confront the cam communicating oil holes 42*hb* and 42*hb* of the intake side camshaft 42, oil is supplied to the cam surfaces of the first cam lobes 43A, and parts in sliding contact with the intake rocker arms 72 are lubricated.

As described above, in both the leftward and rightward shifts, oil is supplied to the parts in sliding contact with the cam lobes 43A and 43B and the intake rocker arms 72, and the parts in sliding contact are lubricated.

As will be noted from FIG. 5, the exhaust side camshaft 52 has the same configuration as the intake side camshaft 42, and a left flange 52A, a journal portion 52B, a right flange 52C and a spline shaft 52D are formed in this order.

The exhaust side cam carrier 53 is fitted on the spline shaft 52D of the exhaust side camshaft 52 via splines. The first cam lobe 53A and the second cam lobe 53B of each of two right and left pairs are different in cam profile, and the two pairs are arranged in axially spaced-apart positions on the outer peripheral surface of the exhaust side cam carrier 53, with a journal cylindrical portion 53C of a predetermined axial length between the two pairs on the intake side cam carrier 43.

The adjoining first and second cam lobes 53A and 53B has their outer diameters of base circles of the cam profiles equal to each other.

Figure 11:
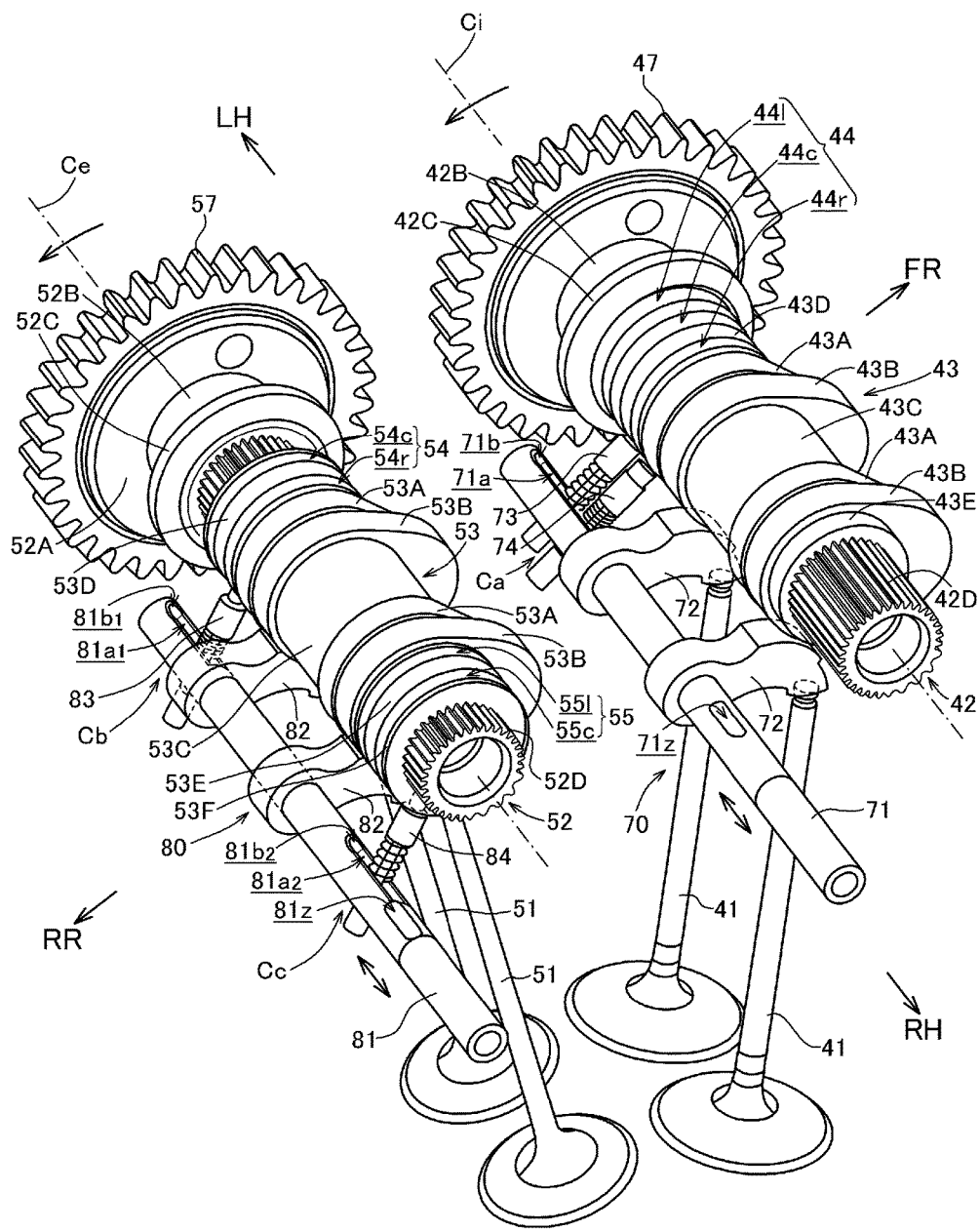
FIG. 11 is a perspective view showing only main components of an intake side cam changeover mechanism and an exhaust side cam changeover mechanism.

As shown in FIGS. 4 and 11, the exhaust side cam carrier 53 is provided with a lead groove cylindrical portion 53D having two lead grooves 54 which are basically parallel but partially communicating with each other. In this respect, the lead groove cylindrical portion 53D is different from the lead groove cylindrical portion 43D of the intake side cam carrier 43. The lead groove cylindrical portion 53D is provided on the left side of the first cam lobe 53A of the left pair, with the left lead grooves 54 surrounding the lead groove cylindrical portion 53D. The exhaust side cam carrier 53 is provided also with a lead groove cylindrical portion 53E formed on the right side of the second cam lobe 53B of the right pair with the right lead grooves 55 surrounding the lead groove cylindrical portion 53E. The exhaust side cam carrier 53 is provided also with a right-end cylindrical portion 53F formed on the right end of the lead groove cylindrical portion 53E.

Outer diameters of the lead groove cylindrical portions 53D and 53E are smaller than the outer diameters of the base circles having the same diameter as those of the first cam lobe 53A and the second cam lobe 53B.

As shown in FIGS. 4 and 5, the lead grooves 54 of the left lead groove cylindrical portion 53D include an annular lead groove 54*c* adjacent to the left end surface of the exhaust side cam carrier 53. The annular lead groove 54*c* surrounds circumferentially the lead groove cylindrical portion 53D at a predetermined axial position. The lead grooves 54 of the left lead groove cylindrical portion 53D also include a right shift lead groove 54*r* spirally formed at an axial position spaced rightward by a predetermined axial distance. The right shift lead groove 54*r* branches rightward from the annular lead groove 54*c*.

The lead grooves 55 of the right lead groove cylindrical portion 53E include an annular lead groove 55*c* circumferentially surrounding the lead groove cylindrical portion 53E at a predetermined axial position, and a left shift lead groove 55*l* spirally formed at a predetermined axial distance leftward of the annular lead groove 55*c* and branching leftward from the annular lead groove 55*c*.

A bottomed cylindrical cap 56 is fitted on the right-end cylindrical portion 53F (FIG. 11) of the exhaust side cam carrier 53.

Besides, an exhaust side driven gear 57 is coaxially fitted to the left flange 52A of the exhaust side camshaft 52 from the left side and the exhaust side driven gear 57 is integrally fastened by two screws 58 (see FIGS. 4, 5).

Referring to FIG. 5, the exhaust cam carrier 53 is fitted on the spline shaft 52D of the exhaust side camshaft 52 via splines. The journal portion 52B of the exhaust side camshaft 52 is rotatably supported between the bearing recess 3Ue (see FIG. 6) in the bearing wall 3U of the cylinder head 3 and the semi-circular bearing recess of the camshaft holder 33. The cap 56 is fitted to the right-end cylindrical portion 53F of the exhaust side cam carrier 53, and the journal cylindrical portion 53C of the exhaust side cam carrier 53 is rotatably supported between the bearing recess 3Ve (see FIG. 6) in the bearing wall 3V of the cylinder head 3 and a semi-circular bearing recess of the camshaft holder 34 (see FIG. 4).

The exhaust side camshaft 52 is axially positioned with the bearing wall 3U of the cylinder head 3 and the camshaft holder 33 held between the left and right flanges 52A and 52C of the journal portion 52B. The exhaust side driven gear 57 mounted on the left flange 52A is located in the gear chamber 3*g*.

The exhaust side cam carrier 53, spline-fitted on the spline shaft 52D of the rotatable exhaust side camshaft 52 axially positioned as described above, can be axially shifted and rotated together with the exhaust side camshaft 52.

The journal cylindrical portion 53C having the predetermined axial length of the exhaust side cam carrier 53 is supported by the bearing wall 3V of the cylinder head 3 and the camshaft holder 34. Axial shift of the exhaust side cam carrier 53 is limited by abutment of the second cam lobe 53B of the left pair abuts with the left sides of the bearing wall 3V and the camshaft holder 34 and by abutment of the first cam lobe 53A of the right pair with the right sides of the bearing wall 3V and the camshaft holder 34.

A supply path of lubricant oil lubricating the exhaust side cam camshaft 52, a spline-fitting portion of the exhaust side cam carrier 53 and bearings are substantially the same as in the structure of the intake side camshaft 42 and the intake side cam carrier 43.

The intake side driven gear 47 mounted on the left flange 42A of the intake side camshaft 42 and the exhaust side driven gear 57 mounted on the left flange 52A of the exhaust side camshaft 52 are arranged side by side in the gear chamber 3g to extend in a plane perpendicular to the thickness directions of the gear chamber 3g.

As shown in FIG. 2, both the intake side driven gear 47 on the front side and the exhaust side driven gear 57 on the rear side are of the same diameter, and an idle gear 61 meshing with these driven gears 47 and 48 are provided below and between both the driven gears.

The idle gear 61 is a gear having a larger diameter than the intake side and exhaust side driven gears 47 and 57 the exhaust side driven gear 57, and, as shown in FIG. 10, the idle gear 61 is rotatably supported via a bearing 63 on a cylindrical hollow spindle 65 extending between the left wall 3L of the cylinder head 3 and the bearing wall 3U and passing through the gear chamber 3g.

The cylindrical hollow spindle 65 is fixed to the bearing wall 3U by a bolt 64 passing through the left wall 3L.

The hollow spindle 65 is fastened and fixed by the bolt 64 in such a state that the inner race of the bearing 63 is held between an end face of an enlarged-diameter portion of the spindle 65 and the bearing wall 3U. A collar 65a is fitted on the spindle 65.

Still referring to FIG. 10, the idle gear 61 has a cylindrical boss 61b fitted in the outer race of the bearing 63 and protruding rightward, and an idle chain sprocket 62 is fitted on the outer peripheral surface of the cylindrical boss 61b.

The idle chain sprocket 62 has substantially the same (or somewhat larger) diameter as the idle gear 61.

As shown in FIGS. 7 and 10, the large-diameter idle chain sprocket 62 is located at the same axial position (in the transverse direction) as the bearing 3UA forming the bearing recesses 3Ui and 3Ue in the upper end of the bearing wall 3U for bearing the journal portion 42B of the intake side camshaft 42 and the journal portion 52B of the exhaust side camshaft 52. The idle chain sprocket 62 is located under the bearing 3UA.

The bearing recesses 33i and 33e (FIG. 7) of the camshaft holder 33 position from above the journal portion 42B of the intake side camshaft 42 and the journal portion 52B of the exhaust side camshaft 52 in the bearing recesses 3Ui and 3Ue of the bearing 3UA of the cylinder head 3. As indicated in FIG. 4, the camshaft holder 33 has fastening portions 33a and 33b on the two sides of the intake side camshaft 42 and fastening portions 33c and 33d on the two sides of the exhaust side camshaft 52. These fastening portions 33a, 33b and 33c, 33d have bolt holes therein, through which fastening bolts 38a, 38b and 38c, 38d are passed to fixedly fasten the camshaft holder 33 to the cylinder head 3.

As the idle chain sprocket 62 of a large diameter is positioned below the bearing 3UA of the cylinder head 3, the two outside fastening bolts 38a and 38d in the front-rear direction out of the four fastening bolts 38a, 38b and 38c, 38d fasten the fastening portions 33a and 33d on the two sides of the idle chain sprocket 62 (see FIGS. 4 and 7).

On the bearing wall 3U of the cylinder head 3 and the camshaft holder 33 are formed axially protruding portions 3UB (FIG. 5) and 33B (FIG. 4), respectively, protruding to the inside (to the right side) in the regions between the intake side camshaft 42 and the exhaust side camshaft 52.

The protruding portions 3UB and 33B protrude to the right side away from the idle chain sprocket 62 to avoid interference with the idle chain sprocket 62 as shown in FIGS. 4 and 5. The protruding portions 3UB and 33B are provided in substantially the same axial position as the lead groove cylindrical portion 43D of the intake side cam carrier 43. The protruding portions 3UB and 33B and the lead groove cylindrical portion 43D are positioned close to each other in the front-rear direction crossing the axial direction.

As shown in FIGS. 4 and 7, out of the four fastening bolts 38a, 38b and 38c, 38d, the two inside fastening bolts 38b and 38c fasten the fastening portions 33b and 33c, respectively, of the protruding portion 33B to the protruding portions 3UB.

As already described and shown in FIG. 4, the camshaft holder 34 positions the journal cylindrical portion 43C of the intake side cam carrier 43 and the journal cylindrical portion 53C of the exhaust side cam carrier 53, and the journal cylindrical portions 43C and 53C are held between the bearing wall 3V and the camshaft holder 34. On the two sides of the length of the journal cylindrical portion 43C, the camshaft holder 34 is fastened to the cylinder head 3 by fastening bolts 39a and 39b with the journal cylindrical portion 43C held between the fastening bolts 39a and 39b, and by fastening bolts 39c and 39d with the journal cylindrical portion 53C held between the fastening bolts 39c and 39d.

An ignition plug insertion cylinder 34p is formed in the center of the camshaft holder 34 and coupled to a plug insertion cylinder 3Vp of the bearing wall 3V (see FIG. 4).

Referring to FIG. 2, a cam chain 66 is wound around the large-diameter idle chain sprocket 62 and a small-diameter driving chain sprocket 67 on the crankshaft 10.

As will be noted from FIG. 2 tension is applied to the cam chain 66 wound on the idle chain sprocket 62 and the driving chain sprocket 67 by a cam chain tensioner guide 68. The cam chain 66 is guided by a cam chain guide 69 to be driven.

Accordingly, as rotation of the crankshaft 10 is transmitted to the idle chain sprocket 62 via the cam chain 66, the idle chain sprocket 62 is driven in rotation, causing the idle gear 61 to rotate. The rotation of the idle gear 61 turns the intake side driven gear 47 and the exhaust side driven gear 57 meshing with the idle gear 61, the intake side driven gear 47 causing the intake side camshaft 42 to rotate and the exhaust side driven gear 57 causing the exhaust side camshaft 52 to rotate.

FIG. 11 shows a perspective view of only main components of an intake side cam changeover mechanism 70 and an exhaust side cam changeover mechanism 80 of the variable valve train or valve operating mechanism 40.

The intake side cam carrier 43 and the exhaust side cam carrier 53 are fitted via the splines on the intake side camshaft 42 and the exhaust side camshaft 52, respectively, which are rotated in synchronization with the crankshaft 10.

The intake side cam changeover mechanism 70 includes an intake side changeover driving shaft 71, which is arranged on the rear of and below the intake side camshaft 42 in parallel with the camshaft 42. The exhaust side cam changeover mechanism 80 includes an exhaust side changeover driving shaft 81, which is arranged on the rear of and below the exhaust side camshaft 52 in parallel with the camshaft 52.

The intake side changeover driving shaft 71 and the exhaust side changeover driving shaft 81 are supported by the cylinder head 3.

Referring to FIG. 6, the valve chamber 3c of the cylinder head 3 is formed integrally therein with a cylindrical portion 3A extending linearly in the transverse direction from a position in front of the center of the bearing wall 3U through the bearing wall 3V to the right wall 3R.

The valve chamber 3c of the cylinder head 3 is also formed integrally therein with a cylindrical portion 3B extending linearly in the transverse direction on and along the inner surface of the rear wall 3Rr, from a position in front of the bearing wall 3U through the bearing wall 3V to the right wall 3R.

The intake side changeover driving shaft 71 is axially slidably inserted in an axial hole of the cylindrical portion 3A and the exhaust side changeover driving shaft 81 is axially slidably inserted in an axial hole of the cylindrical portion 3B.

As shown in FIGS. 6 and 8, the cylindrical portion 3A are cut at two locations corresponding to the right and left intake valves 41, on the two sides of the bearing wall 3V, so that the intake side changeover driving shaft 71 is exposed through the cutout portions. The intake rocker arms 72 are swingably supported in the cutout portions by the intake side changeover driving shaft 71.

That is, the intake side changeover driving shaft 71 functions as a rocker arm shaft.

Referring to FIG. 11, one end of each of the intake rocker arms 72 abuts on the upper end of each of the intake valves 41, and either of the first cam lobe 43A or the second cam lobe 43B is adapted to slidingly contact a curved upper end surface of the one end of the associated intake rocker arm 72 by axial shift of the intake side cam carrier 43.

Accordingly, when the intake side cam carrier 43 is rotated, either of the first cam lobe 43A or the second cam lobe 43B acts on and swing the associated intake rocker arm 72 according to a profile of either one of the cam lobes 43A or 43B, to press the associated intake valve 41, and either of the first cam lobe 43A or the second cam lobe 43B operates to open the associated intake valve for the combustion chamber 30.

Similarly, the cylindrical portion 3B are cut at positions corresponding to the right and left exhaust valves 51 on both sides of the bearing wall 3V, and the exhaust side changeover driving shaft 81 is exposed in the cutout portions. Exhaust rocker arms 82 are rockably supported in the cutout portions by the exhaust side changeover driving shaft 81 (see FIG. 6).

That is, the exhaust side changeover driving shaft 81 functions as a rocker arm shaft.

As shown in FIG. 11, one end of each of the exhaust rocker arms 82 abuts on an upper end of each of the exhaust valves 51, and either of the first cam lobe 53A or the second cam lobe 53B is adapted to slidingly contact a curved upper end surface of the one end of the associated exhaust rocker arm 82 by axial shift of the exhaust side cam carrier 53.

Accordingly, when the exhaust side cam carrier 53 is rotated, either of the first cam lobe 53A or the second cam lobe 53B operates to rock the associated exhaust rocker arm 82 according to a profile of either of the cam lobe 53A or the second cam lobe 53B to press the associated exhaust valve 51, and either of the first cam lobe 53A or the second cam lobe 53B operates to open the associated exhaust valve for the combustion chamber 30.

As shown in FIGS. 5 and 6, on the cylindrical portion 3A are provided two adjoining cylindrical bosses 3As to protrude toward the lead groove cylindrical portions 43D of the intake side cam carrier 43 at locations adjacent to the lead groove cylindrical portions 43D. The two cylindrical bosses 3As are positioned close to the bearing wall 3U.

The cylindrical bosses 3As have their inside holes open into the axial hole in the cylindrical portion 3A.

The first changeover pin 73 and a second changeover pin 74 are slidably fitted in the inside holes of the right and left cylindrical bosses 3As.

With reference to FIG. 8, the openings of the cylindrical bosses 3As from which the first changeover pin 73 and the second changeover pin 74 protrude from the cylindrical bosses 3As overlap with the largest-diameter circles of the cam noses of the first and second cam lobes 43A and 43B as viewed in the axial view of FIG. 8.

That is, the largest-diameter circle of the first cam lobe 43A having the lower cam nose overlaps with the openings of the cylindrical bosses 3As in the axial view of FIG. 8.

Therefore, the intake side changeover driving shaft 71 can be disposed as close to the intake side camshaft 42 as possible and the internal combustion engine E can be made compact.

Figure 12:
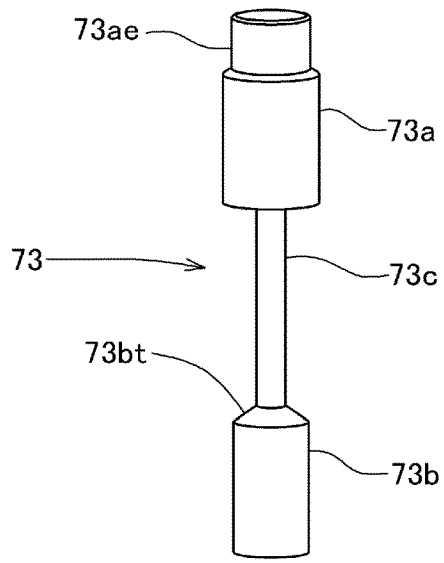
FIG. 12 is a perspective view of changeover pins.

As shown in FIG. 12, the first changeover pin 73 has an end cylindrical portion 73a and a base cylindrical portion 73b, which are linearly coupled by an intermediate rod 73c.

The base cylindrical portion 73b has a smaller outer diameter than the end cylindrical portion 73a.

From the end cylindrical portion 73a protrudes a fitting end 73ae of a reduced diameter.

A conical end surface 73bt is formed on the base cylindrical portion 73b on the end thereof connected to the intermediate rod 73c.

The end surface of the base cylindrical portion 73b on the side of the intermediate rod 73c may be spherical.

The second changeover pin 74 has the same shape as the first changeover pin 73.

Figure 13:
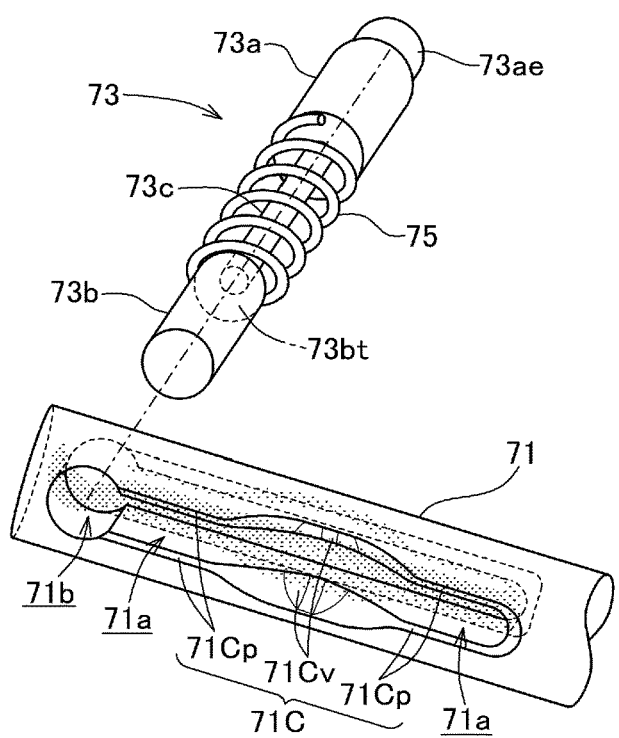
FIG. 13 is an exploded perspective view showing an intake side changeover driving shaft and a first changeover pin.

The intake side changeover driving shaft 71, as shown in FIG. 13, has an elongated through opening 71a extending along the shaft center in the left end portion of the shaft 71, and a circular hole 71b extending across the shaft center in the left end of the elongated opening 71a. The elongated opening 71a is basically of a rectangular cross-sectional shape diametrically penetrating the shaft 71.

The width of the elongated opening 71a is slightly larger than the diameter of the intermediate rod 73c of the first changeover pin 73, and the inner diameter of the circular hole 71b is slightly larger than the outer diameter of the base cylindrical portion 73b but is smaller than the outer diameter of the end cylindrical portion 73a of the first changeover pin 73.

Still referring to FIG. 13, one opening end surface of the elongated opening 71a of the intake side changeover driving shaft 71 is formed to have a cam face 71C made up of axially extending and sloping linear flat surface 71Cp and concave curved surface 71Cv of a predetermined shape, formed in the intermediate portions of the linear flat surface 71Cp.

Figure 14:
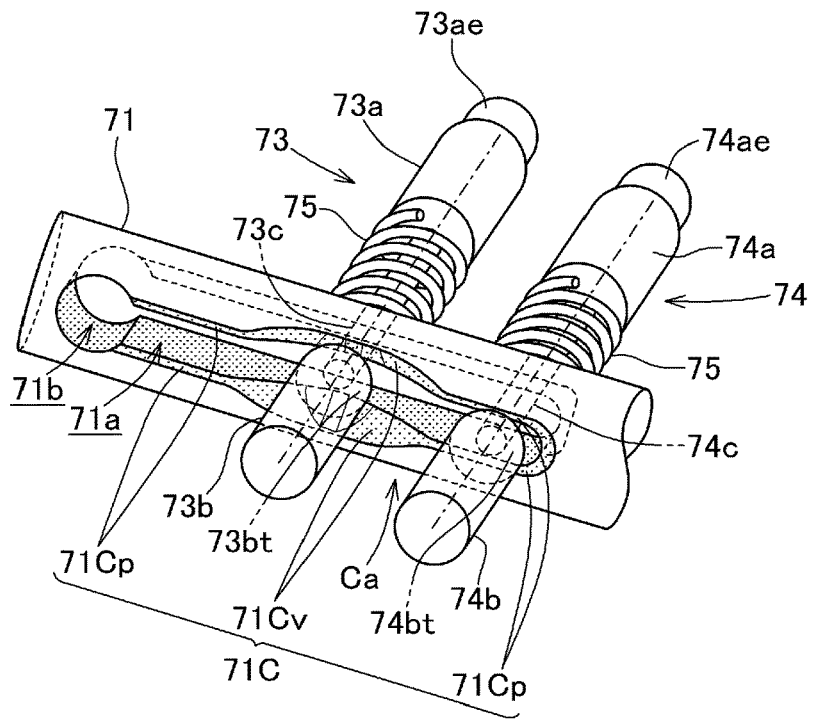
FIG. 14 is a perspective view showing a state that the first changeover pin and the second changeover pin are inserted in the intake side changeover driving shaft.

As FIG. 14 shows, the intermediate rod 73c of the first changeover pin 73 is passed through the elongated opening 71a of the intake side changeover driving shaft 71 in such a manner that the intermediate rod 73c is slidably received in the elongated opening 71a.

The first changeover pin 73 is fitted into the intake side changeover driving shaft 71 as follows.

As shown in FIG. 13, a helical spring 75 is wound about the first changeover pin 73. The inner diameter of the helical spring 75 is larger than the outer diameter of the base cylindrical portion 73b and the outer diameter of the helical spring 75 is smaller than the outer diameter of the end cylindrical portion 73a. Therefore, the end surface of the end cylindrical portion 73a on the side of the intermediate rod 73c abuts on the end of the helical spring 75 when the first changeover pin 73 is inserted inside the helical spring 75 from the side of the base cylindrical portion 73b.

When the intake side changeover driving shaft 71 is inserted into the axial hole in the cylindrical portion 3A of the cylinder head 3, the circular hole 71b is made coaxial with an internal hole of the cylindrical boss 3As formed on the cylindrical portion 3A. When the first changeover pin 73 with the helical spring 75 wound therearound is inserted into the internal hole of the cylindrical boss 3As with its base cylindrical portion 73b ahead, the first changeover pin 73 is slidably inserted into the internal hole of the cylindrical boss 3As together with the helical spring 75 (see FIG. 8). Further, the base cylindrical portion 73b pierces the circular hole 71b of the intake side changeover driving shaft 71 that has been inserted in the axial hole of the cylindrical portion 3A (see FIG. 13).

The helical spring 75 is not allowed to pierce the circular hole 71b even when the base cylindrical portion 73b of the first changeover pin 73 pierces the circular hole 71b of the intake side changeover driving shaft 71. The end of the helical spring 75 abuts on an opening end surface of the circular hole 71b, and the helical spring 75 is compressed between the opening end surface of the circular hole 71b and the end surface of the end cylindrical portion 73a.

When the intake side changeover driving shaft 71 is shifted leftward in the state that the base cylindrical portion 73b of the first changeover pin 73 has moved fully through the circular hole 71b, with the intermediate rod 73c at an axial position within the axial extent of the elongated opening 71a, the intermediate rod 73c is caused to be inserted into the elongated opening 71a in such a state that the helical spring 75 is compressed.

Then, as shown in FIG. 14, the conical end surface 73bt of the base cylindrical portion 73b of the first changeover pin 73 is urged and abutted on the cam surfaces 71C which are the opening end surface of the elongated opening 71a of the intake side changeover driving shaft 71, under the resilient urging force of the helical spring 75, whereby the first changeover pin 73 is fitted in position.

As described above, as the intermediate rod 73c of the first changeover pin 73 is passed through the elongated opening 71a of the intake side changeover driving shaft 71, the conical end surface 73bt of the base cylindrical portion 73b is pressed and abutted on the cam faces 71C which are the opening end surfaces of the elongated opening 71a of the intake side changeover driving shaft 71, under the force of the helical spring 75. Then, when the intake side changeover driving shaft 71 is axially shifted, the cam face 71C, on which the conical end face 73bt of the base cylindrical portion 73b of the first changeover pin 73 is in contact, is also axially shifted, whereby the first changeover pin 73 is caused to advance or retract in a direction perpendicular to the axial direction of the first changeover driving shaft 71, following the contour of the cam surface 71C. This mechanism for advancing or retracting the first changeover pin 73 constitutes a linear motion cam mechanism Ca.

The linear motion cam mechanism Ca operates in the following manner. When the conical end face 73bt of the first changeover pin 73 abuts on the flat surface 71Cp of the cam face 71C of the intake side changeover driving shaft 71, the first changeover pin 73 takes a retracted position, while, when the intake side changeover driving shaft 71 is shifted and the conical end face 73bt abuts on the concave curved face 71Cv of the cam face 71C, the first changeover pin 73 advances under the urging force of the helical spring 75.

The second changeover pin 74 also has the same configuration as the first changeover pin 73. The second changeover pin 74 similarly is passed through the same elongated opening 71a of the intake side changeover driving shaft 71, and a conical end face 74bt of a base cylindrical portion 74b is also pressed and abutted on the cam face 71C under the force of a helical spring 75, whereby a linear motion cam mechanism Ca is configured (see FIG. 14).

When the first changeover pin 73 and the second changeover pin 74 are fitted through the intake side changeover driving shaft 71, the second changeover pin 74 is first fitted and thereafter the first changeover pin 73 is fitted.

As illustrated in FIG. 4, the right side of the intake side changeover driving shaft 71 is formed with a shift regulation hole 71z which is an elongated hole having a predetermined axial length. The shift regulation hole 71z is located at the right side of the region where the intake rocker arm 72 is supported (see FIG. 11). A shift regulation pin 76 is inserted through a small hole 3Ah (FIG. 6) formed in the cylindrical portion 3A of the cylinder head 3 and engages in the shift regulation hole 71z. Thus, axial shift of the intake side changeover driving shaft 71 is limited between predetermined positions.

As shown in FIG. 14, the first changeover pin 73 and the second changeover pin 74 are arranged in parallel with each other, and the first changeover pin 73 and the second changeover pin 74 are passed through the common elongated opening 71a of the intake side changeover driving shaft 71.

FIG. 14 shows a state in which the first changeover pin 73 is located in the center of the concave curved surface 71Cv of the cam surface 71C of the intake side changeover driving shaft 71, the first changeover pin 73 being at the position in which the first changeover pin 73 has advanced with the conical end surface 73bt abutting on the concave curved face 71Cv. FIG. 14 further shows a state in which the second changeover pin 74 abuts on the flat surface 71Cp of the cam surface 71C, and the second changeover pin 74 is located in a retracted position.

When the intake side changeover driving shaft 71 is shifted rightward from state of FIG. 14, the conical end surface 73bt of the first changeover pin 73 ascends the inclined parts of the concave curved surface 71Cv from the center region of the concave curved surface 71Cv, so that the first changeover pin 73 is caused to gradually retract and the conical end surface 73bt abuts on the flat surface 71Cp. On the other hand, the conical end surface 74bt of the second changeover pin 74 descends the inclined parts of the concave curved surface 71Cv from the flat surface 71Cp, so that the second changeover pin 74 is caused to advance with the conical end surface 74bt abutting on the center region of the concave curved face 71Cv.

As described above, the first changeover pin 73 and the second changeover pin 74 can be alternately advanced or retracted by the axial shift of the intake side changeover driving shaft 71.

To press the first and second changeover pins 73 and 74 in the advancing directions, the helical springs 75 are interposed between the end cylindrical portions 73a and 74a and the intake side changeover driving shaft 71. Instead, a helical spring may be interposed between an end surface (an end surface on the reverse side of each conical end surface 73bt or 74bt) of each base cylindrical portion 73b or 74b and the bottom of a recess formed in the surface of the cylindrical portion 3A.

As shown in FIG. 6, the axially center region of the cylindrical portion 3B has thereon a cylindrical boss 3Bs formed at the left side of the bearing wall 3V and the exhaust rocker arm 82, so as to protrude toward the lead groove cylindrical portion 53D (FIGS. 4 and 5) of the exhaust side cam carrier 53 at a location corresponding to the lead groove cylindrical portion 53D. Another similar cylindrical boss 3Bs is formed in the center of the cylindrical portion 3B on the right side of the bearing wall 3V and the second exhaust rocker arm 82. This latter cylindrical boss 3Bs protrudes at a location corresponding to the lead groove cylindrical portion 53E of the exhaust side cam carrier 53 toward the lead groove cylindrical portion 53E.

Referring to FIG. 11, on the exhaust side changeover driving shaft 81 are formed axially elongated through openings $81a_1$ and $81a_2$ similar to the elongated through opening 71a. The elongated openings $81a_1$ and $81a_2$ are formed through the axial center axis of the exhaust side changeover driving shaft 81 in axially spaced apart portions of the shaft 81 in the left side and in the right side. Circular holes $81b_1$ and $81b_2$ similar to the circular hole 71b are also provided at the left ends of the elongated openings $81a_1$ and $81a_2$.

The width of each of the elongated openings $81a_1$ and $81a_2$ and the internal diameter of each of the circular holes $81b_1$ and $81b_2$ are the same as those of the elongated opening 71a and the circular hole 71b of the intake side changeover driving shaft 71.

Figure 15:
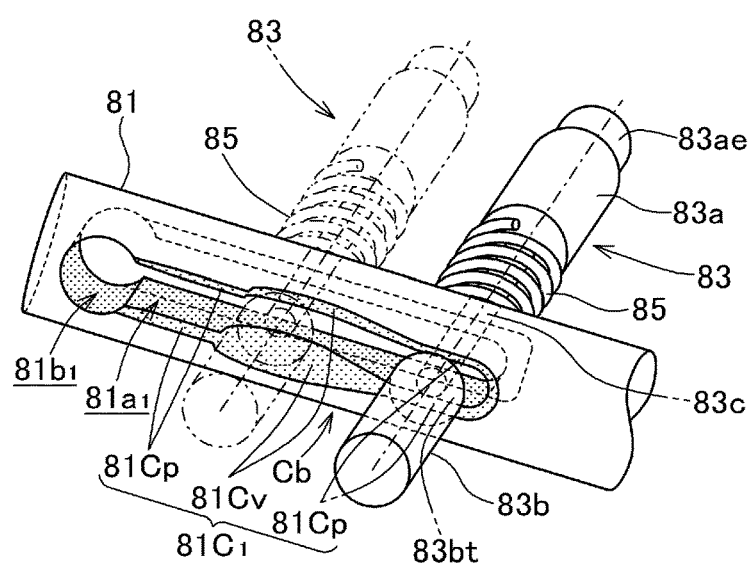
FIG. 15 is a perspective view showing a state that the first changeover pin is inserted in the exhaust side changeover driving shaft.

As shown in FIG. 15, the opening end surface of the left elongated opening $81a_1$ of the exhaust side changeover driving shaft 81 is formed as a cam surface $81C_1$ made up of an axially flat surface 81Cp on the rim of the opening, and a concave curved surface 81Cv with a predetermined contour formed in an axially intermediate portion of the flat surface 81Cp. The flat surface 81Cp extend axially linear and formed to be inclined or slope.

As shown in FIG. 11, one opening end surface of the right elongated opening $81a_2$ of the exhaust side changeover driving shaft 81 is configured in a similar manner as the left elongated opening $81a_1$ and has a cam surface $81C_2$ made up of an axially flat inclined surface on the rim of the opening, and a concave curved surface 81Cv with a predetermined contour located close to the right of the flat surface.

The left and right elongated openings $81a_1$ and $81a_2$ and the left and right cam surfaces $81C_1$ and $81C_2$ of the exhaust side changeover driving shaft 81 are symmetrically formed in the axial direction.

As shown in FIG. 15, an intermediate rod 83c of a first changeover pin 83 pierces the left elongated opening $81a_1$ of the exhaust side changeover driving shaft 81 in a manner slidable along the left elongated opening, and a linear motion cam mechanism Cb is formed by the cam surface $81C_1$.

Similarly, as shown in FIGS. 6 and 11, a second changeover pin 84 is slidably fitted in the right elongated opening $81a_2$ of the exhaust side changeover driving shaft 81 and a linear motion cam mechanism Cc is configured by the cam surface $81C_2$.

A procedure for the assembly is performed utilizing the circular holes $81b_1$ and $81b_2$ in the same way as the assembly of the intake side changeover driving shaft 71 and the first changeover pin 73.

The first changeover pin 83 and the second changeover pin 84 are assembled simultaneously.

A shift limiting hole 81z shown in FIG. 11 is an axially elongated hole with a predetermined axial length, and is formed axially adjacent to the right side of the right elongated opening $81a_2$ of the exhaust side changeover driving shaft 81. Axial shift of the exhaust side changeover driving shaft 81 is limited to a shift between predetermined axial positions by a shift limiting pin 86 (see FIG. 6) fitted into a small hole 3Bh in the cylindrical portion 3B of the cylinder head 3 to pass through the shift regulation hole 81z.

FIG. 15 shows such a state that the first changeover pin 83 is located to abut on the right flat surface 81Cp on the right side of the cam surfaces $81C_1$ of the exhaust side changeover driving shaft 81, with a conical end face 83bt of the first changeover pin 83 abutting on the flat surface 81Cp. In this state, the first changeover pin 83 is in a retracted position. At this time, as shown in FIG. 6, a conical end face 84bt of the second changeover pin 84 abuts on the concave curved surface 81Cv of the right cam face $81C_2$, and the second changeover pin 84 is in an advanced position.

When the exhaust side changeover driving shaft 81 is shifted rightward from this state, the conical end face 83bt of the first changeover pin 83 descends the inclined portion of the concave curved surface 81Cv from the flat surface 81Cp, and the conical end surface 83bt abuts on the center region of the concave curved surface 81Cv, so that the changeover pin 83 advances. On the other hand, the conical end surface 84bt of the second changeover pin 84 ascends the inclined surface of the concave curved surface 81Cv from the center region of the concave curved surface 81Cv, and the conical end surface 84bt abuts on the flat surface 81Cp, so that the second changeover pin 84 retracts.

As described above, the first changeover pin 83 and the second changeover pin 84 can be alternately advanced or retracted by the axial shift of the exhaust side changeover driving shaft 81.

The above-described intake side cam changeover mechanism 70 and the above-described exhaust side cam changeover mechanism 80 are arranged, as shown in FIG. 8, on the side of the crankshaft 10 relative to an axis Ci of the intake side camshaft 42 and an axis Ce of the exhaust side camshaft 52. Further, the intake side cam changeover mechanism 70 on one side is arranged between an intake side plane Si and an exhaust side plane Se. The intake side plane Si is a plane including the axis Ci of the intake side camshaft 42 and extending parallel to the cylinder axis Lc. The exhaust side plane Se is a plane including the axis Ce of the exhaust side camshaft 52 and extending parallel to the cylinder axis Lc.

Referring to FIGS. 1 and 4, an intake side hydraulic actuator 77 for axially shifting the intake side changeover driving shaft 71 is provided to protrude from the right wall 3R of the cylinder head 3 and an exhaust side hydraulic actuator 87 for axially shifting the exhaust side changeover driving shaft 81 is provided to protrude at the back of the intake side hydraulic actuator 77 in line with respect to the front-rear direction.

The operation of the intake side cam changeover mechanism 70 will be described, with reference to the explanatory figure of FIG. 16, in the case when the intake side cam carrier 43 is axially shifted by the intake side cam changeover mechanism 70 so as to change the first cam lobe 43A and the second cam lobe 43B and to make the changed cam lobe act on the intake rocker arm 72, referring to below.

Figure 16:
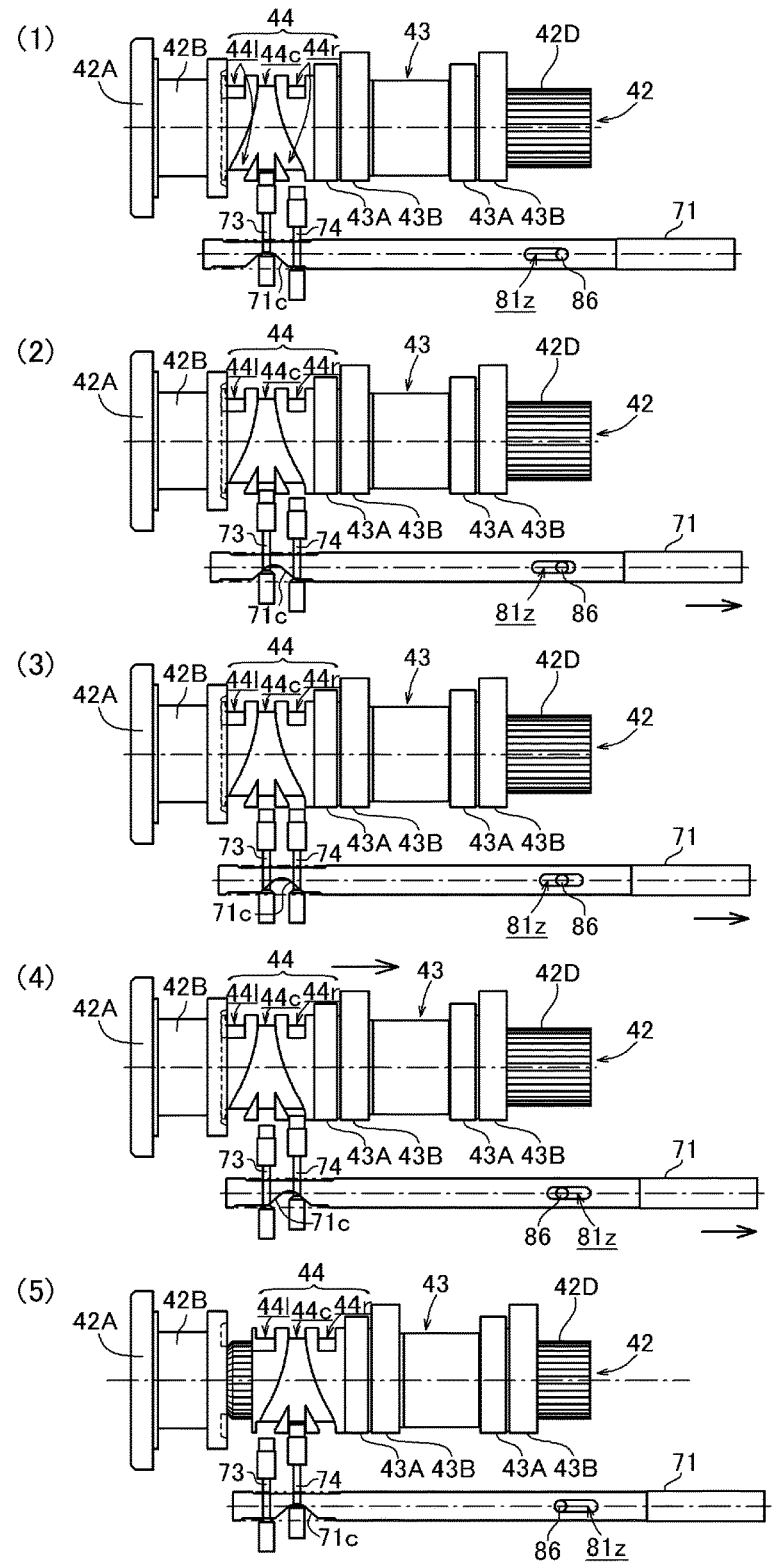
FIG. 16 is an explanatory view sequentially showing operational processes of main members of the intake side cam changeover mechanism.

FIG. 16 sequentially shows operational process steps of main members of the intake side cam changeover mechanism 70.

FIG. 16(1) shows such a state that the intake side cam carrier 43 has been shifted to a position on the left side, the second cam lobes 43B act on the associated intake rocker arms 72 and the intake valves 41 are operated according to valve operating characteristics set in the cam profile of the second cam lobes 43B.

At this time, the intake side changeover driving shaft 71 is also located in a position shifted to the left side, the concave curved surface 71Cv of the cam surface 71C is located at a position of the first changeover pin 73, and the first changeover pin 73 abuts on the concave curved surface 71Cv, so that the first changeover pin 73 is advanced and the first changeover pin 73 is fitted in the annular lead groove 44c of the lead groove cylindrical portion 43D of the intake side cam carrier 43.

The second changeover pin 74 abuts on the flat surface 71Cp of the cam surface 71C, so that the second changeover pin 74 is retracted and separated from the lead groove 44.

As the first changeover pin 73 is fitted in the annular lead groove 44c circumferentially formed in the intake side cam carrier 43, which is rotated via the splines together with the intake side camshaft 42, the intake side cam carrier 43 is maintained in a predetermined position without being axially shifted.

When the intake side changeover driving shaft 71 is shifted rightward from this state by the intake side hydraulic actuator 77, the first changeover pin 73 is guided to ascend the inclined surface of the concave curved face 71Cv so that the first changeover pin 73 starts to retract, while the second changeover pin 74 is guided toward the inclined surface of the concave curved face 71Cv from the flat surface 71Cp so that the second changeover pin 74 is ready to advance (see FIG. 16(2)). In this state, the first changeover pin 73 and the second changeover pin 74 are ready to be separated from the lead groove 44 by substantially the same distance (see FIG. 16(3)). Then, as the intake side changeover driving shaft 71 is shifted rightward further, the first changeover pin 73 abuts on the flat surface 71Cp and is further retracted, while the second changeover pin 74 abuts on the concave curved surface 71Cv so that the second changeover pin 74 further advances and is fitted into the right shift lead groove 44r of the lead groove cylindrical portion 43D (see FIG. 16(4)).

When the second changeover pin 74 is fitted into the right shift lead groove 44r, the intake side cam carrier 43 is axially shifted rightward, while being rotated, with the right shift lead groove 44r being engaged with and guided by the second changeover pin 74 (see FIG. 16(4) and FIG. 16(5)).

When the intake side cam carrier 43 is shifted rightward, the second changeover pin 74 axially moved to the left relative to the intake side cam carrier 43 is guided and fitted into the central annular lead groove 44c, and the intake side cam carrier 43 is maintained in the rightward shifted predetermined position (see FIG. 16(5)). At this time, the first cam lobes 43A act on the intake rocker arms 72 in place of the second cam lobes 43B, and the intake valves 41 are operated according to valve operating characteristics set in the cam profile of the first cam lobes 43A.

As described above, the cam lobes for acting on the intake valves 41 can be changed over from the second cam lobes 43B to the first cam lobes 43A by shifting the intake side changeover driving shaft 71 rightward.

When the second changeover pin 74 is retracted by conversely shifting the intake side changeover driving shaft 71 to the left from the above state, the second changeover pin 74 is separated from the annular lead groove 44c, while the first changeover pin 73 advances, so that the first changeover pin 73 is fitted into the left shift lead groove 44l. As a result, the intake side cam carrier 43 is shifted leftward with the left shift lead groove 44l being engaged by and guided by the first changeover pin 73, so that the cam lobes for acting on the intake valves 41 can be changed over from the first cam lobes 43A to the second cam lobes 43B.

Next, the operation of the exhaust side cam changeover mechanism 80 will be described referring to the explanatory figure of FIG. 17.

Figure 17:
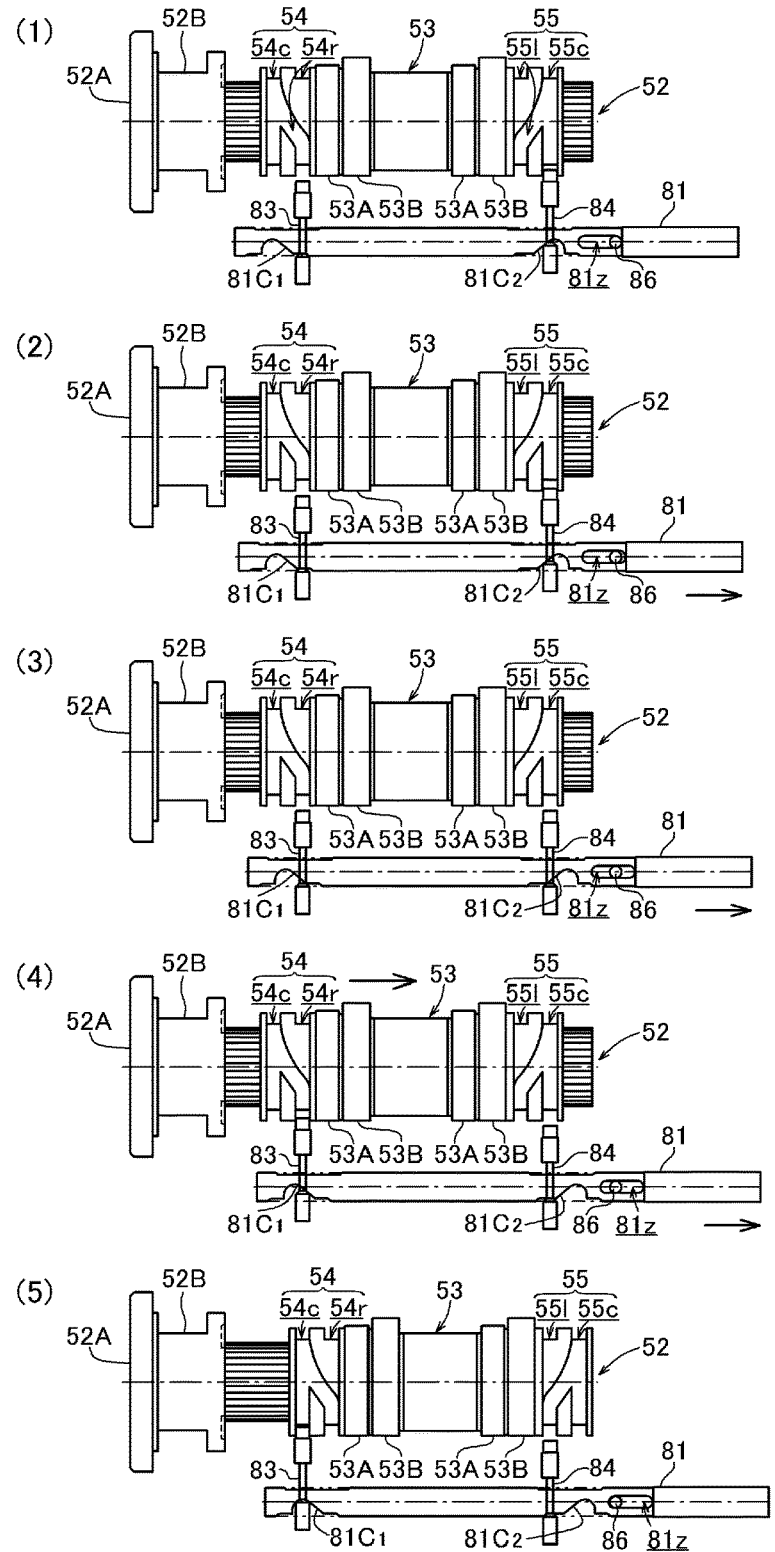
FIG. 17 is an explanatory view sequentially showing operational processes of main members of the exhaust side cam changeover mechanism.

FIG. 17(1) shows such a state that the exhaust side cam carrier 53 is located in a position shifted to the left side, the second cam lobes 53B act on the exhaust rocker arms 82, and the exhaust valves 51 are operated according to valve operating characteristics set in the cam profile of the second cam lobes 53B.

At this time, the exhaust side changeover driving shaft 81 is also located in an axial position on the left side, the first changeover pin 83 abuts on the flat surface 81Cp of the left cam surface $81C_1$ so that the first changeover pin 83 is retracted and separated from the left lead groove 54, while the second changeover pin 84 is located in a position of the concave curved surface 81Cv of the right cam surface $81C_2$, so that the second changeover pin 84 abuts on the concave curved surface 81Cv and is therefore advanced. In this state, the second changeover pin 84 is fitted into the annular lead groove 55c of the right lead groove 55 on the exhaust side cam carrier 53, whereby the exhaust side cam carrier 53 is maintained in a predetermined axial position without being axially shifted.

When the exhaust side changeover driving shaft 81 is shifted rightward from the above state by the hydraulic actuator 87 for the exhaust side, the second changeover pin 84 is guided by the inclined surface of the concave curved surface 81Cv, the second changeover pin 84 is ready to be retracted, while the first changeover pin 83 is guided toward the inclined surface of the concave curved surface 81Cv from the flat surface 81Cp, so that the first changeover pin 83 is ready to advance (see FIG. 17(2)). Thereafter, the first changeover pin 83 and the second changeover pin 84 are separated by substantially the same distance from the lead grooves 54 and 55 (see FIG. 17(3)). As the exhaust side changeover driving shaft 81 is shifted further rightward, the second changeover pin 84 abuts on the flat surface 81Cp so that the second changeover pin 84 further retracts and the first changeover pin 83 abuts on the concave curved surface 81Cv to be advanced further. As a result, the first changeover pin 83 is fitted into the right shift lead groove 54r of the left lead groove 54 (see FIG. 17(4)).

When the first changeover pin 83 is fitted into the right shift lead groove 54r, the exhaust side cam carrier 53 is axially shifted to a rightward shifted position, while being rotated, such that the first changeover pin 83 engaging with the right shift lead groove 54r gradually engages with the left annular lead groove 54c (see FIG. 17(4) and FIG. 17(5)).

As the first changeover pin 83 is fitted in the left annular lead groove 54c when the exhaust side cam carrier 53 is shifted rightward, the exhaust side cam carrier 53 is maintained in a rightward shifted predetermined position (see FIG. 17(5)). At this time, in place of the second cam lobes 53B, the first cam lobes 53A act on the exhaust rocker arms 82, and the exhaust valves 51 are operated according to valve operating characteristics set in the cam profile of the first cam lobes 53A.

As described above, the cam lobes for acting on the exhaust valves 51 can be changed over from the second cam lobes 53B to the first cam lobes 53A by shifting the exhaust side changeover driving shaft 81 rightward.

The first changeover pin 83 and the second changeover pin 84 are moved oppositely by conversely shifting the exhaust side changeover driving shaft 81 leftward from the above state. The first changeover pin 83 is retracted and separated from the annular lead groove 54c, the second changeover pin 84 is advanced to be fitted into the left shift lead groove 55l. The exhaust side cam carrier 53 is shifted leftward under the guidance by the left shift lead groove 55l, and the cam lobes for acting on the exhaust valves 51 can be changed over from the first cam lobes 53A to the second cam lobes 53B.

One embodiment of the internal combustion engine according to the present invention has been described in detail above, and the engine produces the following effects.

As shown in FIG. 10 (and FIG. 5), the idle chain sprocket 62 is provided at a position axially overlapping with the bearing 3UA of the bearing wall 3U and the camshaft holder 33, so that the idle gear 61 can be brought axially close to the bearing 3UA, the intake and exhaust side driven gears 47 and 57 in meshing engagement with the idle gear 61 are also brought axially close to the bearing 3UA. Further, the end portions of the intake and exhaust side camshafts 42 and 52, axially protruding beyond the bearings 3UA, are given a reduced length, so that the intake and exhaust driven gears 47 and 57 on the end portions can be installed close to the bearing 3UA. Therefore, the axial size of the engine E is reduced, and the entire engine can be made compact.

As shown in FIGS. 4 and 7, the total four fastened portions of the camshaft holder 33 includes the fastened portions 33a and 33b on both sides of the intake side camshaft 42 and the fastened portions 33c and 33d on both sides of the exhaust side camshaft 52. These fastened portions of the camshaft holder 33 are fastened to the bearing 3UA of the bearing wall 3U by the fastening bolts 38a, 38b, 38c and 38d. The outside two fastening bolts 38a and 38d out of the four fastening bolts 38a, 38b, 38c and 38d fasten the fastened portions 33a and 33d at both sides of the idle chain sprocket 62 located between the two fastened portions. The outside two fastening bolts 38a and 38d located at the same axial position as the idle chain sprocket 62 are located on both sides of the idle chain sprocket 62, avoiding interference with the idle chain sprocket 62 without being protruding upward, and consequently, increase in size of the internal combustion engine can be avoided without making the two fastening bolts 38a and 38d project upward of the cylinder head 3 of the engine.

As shown in FIG. 4, the bearing wall 3U and the camshaft holder 33 are provided with the protruding portions 3UB and 33B extending axially to the inside between the intake and exhaust side camshafts 42 and 52, and the inside two fastening bolts 38b and 38c out of the four fastening bolts 38a, 38b, 38c and 38d fasten the fastened portions 33b and 33c of the protruding portions 3UB and 33B. Thus, the inside two fastening bolts 38b and 38c can fasten the fastened portions 33b and 33c at positions axially apart from the idle chain sprocket 62, avoiding interference with the idle chain sprocket 62. Further, the protruding portions 3UB and 33B of the bearing wall 3U and the camshaft holder 33 extend axially, utilizing the space between the intake and exhaust side camshafts 42 and 52, so that the camshaft holder 33 can be compactly attached without increasing sizing of the engine E.

As shown in FIG. 4, the outer diameter of the lead groove cylindrical portion 43D including the lead groove 44 of the intake side cam carrier 43 is smaller than the outer diameters of the base circles of the first and second cam lobes 43A and 43B, and the outer diameters of the lead groove cylindrical portions 53D and 53E including the lead grooves 54 and 55 of the exhaust side cam carrier 53 are smaller than the outer diameters of the base circles of the first and second cam lobes 53A and 53B. Further, the protruding portions 3UB and 33B of the bearing wall 3U and the camshaft holder 33 protrude to axially inside between the intake and exhaust camshafts 42 and 52, to be located in the same axial area as at least one lead groove cylindrical portion 43D of the intake and exhaust side cam carriers 43 and 53. For this reason, the intake and exhaust side cam carriers 43 and 53 extending along the two sides of the protruding portions 3UB and 33B can be located as close to each other as possible, without interference with the cam lobes 43A, 43B, 53A and 53B, and hence the internal combustion engine can be made compact.

The internal combustion engine according to the embodiment of the present invention has been described above in detail. The mode of the present invention is not limited to the above-stated embodiment, and various changes can be made within the scope of the present invention.

For example, in this embodiment, the changeover pins are advanced and retracted by the linear motion cam mechanisms by axially shifting the changeover driving shafts in the cam changeover mechanisms. The changeover pins may be advanced and retracted in directions at right angles with the axial direction by rotation of the cam surfaces caused by rotating the changeover driving shafts.

Besides, the hydraulic actuators are used for driving the changeover driving shafts. However, electromagnetic solenoids, electric motors and others may be used.

REFERENCE SIGNS LIST

E—Internal combustion engine
M—Transmission
1—Crankcase
2—Cylinder block
3—Cylinder head
3g—Gear chamber
10—Crankshaft
11—Main shaft
12—Countershaft
33—Camshaft holder
33a, 33b, 33c, 33d—Fastened portion
34—Camshaft holder
38a, 38b, 38c, 38d—Fastening bolt
39a, 39b, 39c, 39d—Fastening bolt
40—Variable valve train
41—Intake valve
42—Intake side camshaft
42A—Left flange
42B—Borne portion
42C—Right flange
42D—Spline shaft
43—Intake side cam carrier
43A—First cam lobe
43B—Second cam lobe
43C—Journal cylindrical portion
43D—Lead groove cylindrical portion
44—Lead groove
47—Intake side driven gear
51—Exhaust valve
52—Exhaust side camshaft
52A—Left flange
52B—Journal portion
52C—Right flange
52D—Spline shaft
53—Exhaust side cam carrier
53A—First cam lobe
53B—Second cam lobe
53C—Journal cylindrical portion
53D—Lead groove cylindrical portion
53E—Lead groove cylindrical portion
54—Left lead groove
55—Right lead groove
56—Cap 57—Exhaust side driven gear
61—Idle gear
62—Idle chain sprocket
63—Bearing
65—Bolt
65—Cylindrical spindle
66—Cam chain
67—Driving chain sprocket
70—Intake side cam changeover mechanism
71—Intake side changeover driving shaft
72—Intake rocker arm
73—First changeover pin
74—Second changeover pin
80—Exhaust side cam changeover mechanism
81—Exhaust side changeover driving shaft
82—Exhaust rocker arm
83—First changeover pin
84—Second changeover pin

The invention claimed is:

1. An internal combustion engine, comprising:
a cylinder head fixedly fastened on a cylinder block;
a crankshaft rotatable by a piston in the cylinder block;
a DOHC-type valve train provided in the cylinder head and including a rotatable intake side camshaft and a rotatable exhaust side camshaft in parallel arrangement;
a bearing wall with bearings for rotatably supporting the intake side camshaft and the exhaust side camshaft, respectively;
a camshaft holder for holding the intake side camshaft and the exhaust side camshaft supported by the bearings;
an intake side driven gear and an exhaust side driven gear fixedly fitted on ends of the intake side camshaft and the exhaust side camshaft, respectively, the ends of the intake and exhaust side camshafts extending beyond the bearing wall (3U) and the camshaft holder;
an idle gear fixedly supported on a spindle supported in the cylinder head to mesh with both the intake and exhaust side driven gears;
an idle chain sprocket coaxially fixed to the idle gear at an axial position adjacent to the bearing wall; and
a cam chain passed around a driving chain sprocket on the crankshaft and the idle chain sprocket in such a manner that rotational power of the crankshaft is transmitted to the intake and exhaust side camshafts; characterized in that:
the idle chain sprocket is positioned at an axial position coinciding or overlapping with axial positions of the bearings of the bearing wall and the camshaft holder, with respect to an axial direction parallel to the intake and exhaust side camshaft.

2. The internal combustion engine according to claim 1, wherein:
the camshaft holder is fastened to the bearing wall to cover the bearings by fastening bolts, at the same axial position as the idle chain sprocket, to rotatably support the intake and exhaust side camshafts; and
out of the fastening bolts, some fastening bolts arranged at ends of the camshaft holder, with respect to a direction transverse to the axial direction, fasten portions of the camshaft holder on both sides of the idle chain sprocket.

3. The internal combustion engine according to claim 2, wherein:
the bearing wall and the camshaft holder have protruding portions extending axially inward of the bearing wall and the camshaft holder and located between the intake side camshaft and the exhaust side camshaft; and
out of the fastening bolts, at least one fastening bolt fastens a part of the camshaft holder, in the protruding portions.

4. The internal combustion engine according to claim 3, comprising:
a cylindrical intake side cam carrier fitted on and around the intake side camshaft in a manner co-rotatable with, and axially slidable relative to the intake side camshaft, and having a plurality of cam lobes different in cam profile and axially adjacent to each other, the intake side cam carrier having a lead groove cylindrical portion including a lead groove for fitting engagement with a changeover pin;
a cylindrical exhaust side cam carrier fitted on and around the exhaust side camshaft in a manner co-rotatable with, and axially slidable relative to the exhaust side camshaft, and having a plurality of cam lobes different in cam profile and axially adjacent to each other, the exhaust side cam carrier having a lead groove cylindrical portion including a lead groove for fitting engagement with a changeover pin; and
cam changeover mechanisms for advancing and retracting the changeover pin into engagement with and disengagement from the lead groove to axially shift the intake side cam carrier and the exhaust side cam carrier so as to change over the cams lobes;
wherein the lead groove cylindrical portions including the lead grooves have an outer diameter smaller than an outer diameter of base circle of the cam lobes; and
the protruding portions are located in the same axial area as one lead groove cylindrical portion of at least one of the intake side cam carrier and the exhaust side cam carrier.

* * * * *